United States Patent
Kock et al.

(10) Patent No.: US 12,520,787 B2
(45) Date of Patent: Jan. 13, 2026

(54) PERONOSPORA RESISTANCE IN SPINACIA OLERACEA

(71) Applicant: RIJK ZWAAN ZAADTEELT EN ZAADHANDEL B.V., De Lier (NL)

(72) Inventors: Vincent Laurens Adrianus Kock, De Lier (NL); Raoul Jacobus Johannes Maria Frijters, De Lier (NL)

(73) Assignee: RIJK ZWAAN ZAADTEELT EN ZAADHANDEL B.V., De Lier (NL)

( * ) Notice: Subject to any disclaimer, the term of this patent is extended or adjusted under 35 U.S.C. 154(b) by 485 days.

(21) Appl. No.: 17/878,492

(22) Filed: Aug. 1, 2022

(65) Prior Publication Data

US 2023/0257763 A1 Aug. 17, 2023

Related U.S. Application Data

(63) Continuation-in-part of application No. PCT/EP2021/056388, filed on Mar. 12, 2021, which is a continuation-in-part of application No. PCT/EP2020/056739, filed on Mar. 12, 2020.

(51) Int. Cl.
| | |
|---|---|
| *A01H 6/28* | (2018.01) |
| *A01H 1/00* | (2006.01) |
| *A01H 1/02* | (2006.01) |
| *A01H 5/12* | (2018.01) |
| *A01H 6/02* | (2018.01) |
| *C07K 14/415* | (2006.01) |
| *C12N 15/82* | (2006.01) |
| *C12Q 1/6895* | (2018.01) |

(52) U.S. Cl.
CPC ............ *A01H 6/028* (2018.05); *A01H 1/02* (2013.01); *A01H 1/1255* (2021.01); *A01H 5/12* (2013.01); *C07K 14/415* (2013.01); *C12N 15/8282* (2013.01); *C12Q 1/6895* (2013.01); *C12Q 2600/13* (2013.01); *C12Q 2600/156* (2013.01)

(58) Field of Classification Search
CPC ..................... A01H 6/028; A01H 1/1255
See application file for complete search history.

(56) References Cited

U.S. PATENT DOCUMENTS

| | | |
|---|---|---|
| 9,121,029 B2 | 9/2015 | Van Damme et al. |
| 9,265,275 B2 | 2/2016 | Den Braber |
| 9,402,363 B1 | 8/2016 | Feitsma |
| 9,974,276 B2 | 5/2018 | Feitsma et al. |
| 10,017,781 B2 | 7/2018 | Torjek et al. |
| 10,633,670 B2 | 4/2020 | Kock et al. |
| 2005/0183150 A1 | 8/2005 | Torisky et al. |
| 2007/0204368 A1 | 8/2007 | Dale |
| 2009/0300786 A1 | 12/2009 | Baerends |
| 2009/0300788 A1 | 12/2009 | Baerends |
| 2010/0031385 A1 | 2/2010 | Baerends |
| 2012/0054894 A1 | 3/2012 | Den Braber |
| 2013/0055422 A1 | 2/2013 | Baerends |
| 2013/0055454 A1 | 2/2013 | Braber |
| 2013/0230635 A1 | 9/2013 | Den Braber |
| 2014/0065287 A1 | 3/2014 | Den Braber |
| 2014/0068799 A1 | 3/2014 | Den Braber |
| 2014/0068801 A1 | 3/2014 | Den Braber |
| 2014/0068804 A1 | 3/2014 | Den Braber |
| 2014/0068805 A1 | 3/2014 | Den Braber |
| 2014/0068806 A1 | 3/2014 | Den Braber |
| 2015/0082483 A1 | 3/2015 | Dijkstra |
| 2015/0101073 A1 | 4/2015 | Brugmans et al. |
| 2015/0240256 A1 | 8/2015 | Brugmans et al. |
| 2016/0152999 A1 | 6/2016 | Torjek et al. |
| 2016/0177330 A1 | 6/2016 | Dijkstra |
| 2017/0027126 A1 | 2/2017 | Dijkstra et al. |
| 2017/0027127 A1 | 2/2017 | Dijkstra et al. |
| 2017/0127641 A1 | 5/2017 | De Visser |
| 2017/0127642 A1 | 5/2017 | De Visser |
| 2017/0327839 A1 | 11/2017 | Feitsma |
| 2018/0042198 A1 | 2/2018 | Feitsma |
| 2019/0127753 A1 | 5/2019 | Kock |

(Continued)

FOREIGN PATENT DOCUMENTS

| | | |
|---|---|---|
| DE | 10 2013 010026 A1 | 12/2014 |
| EP | 2848114 A1 | 3/2015 |

(Continued)

OTHER PUBLICATIONS

2011 APS-IPPC Joint Meeting Abstracts of Presentations, Phytopathology (2011) 101(6) Supplemental, S1, S52.
Adam Bentham, et al., Animal NLRs Provide Structural Insights into Plant NLF Function, Annals of Botany (2017) 119:689-702.
Joydeep Chakraborty, et al., Functional Diversification of Structurally Alike NLR Proteins in Plants, Plant Science (2018) 269:85-93.
Peter N. Dodds, et al., Six Amino Acid Changes Confined to the Leucine-Rich Repeat β-Strand/β-Turn Motif Determine the Difference between the P and P2 Rust Resistance Specificities in Flax, The Plant Cell (Jan. 2001) vol. 13. p. 163-178.

(Continued)

*Primary Examiner* — David H Kruse
(74) *Attorney, Agent, or Firm* — Duane Morris LLP; Thomas J. Kowalski

(57) ABSTRACT

The present invention relates to an allele designated alpha-WOLF 24 which confers resistance to at least one *Peronospora farinosa* f. sp. *spinacea* race, wherein the protein encoded by said allele is a CC-NBS-LRR protein that comprises in its amino acid sequence: a) the motif "MAEIGYSVC" (SEQ ID NO: 1) at its N-terminus; and b) the motif "KWMCLR" (SEQ ID NO: 2); and wherein the LRR domain of the protein has in order of increased preference at least 95%, 96%, 97%, 98%, 98.2%, 98.5%, 98.8%, 99%, 100% sequence similarity to SEQ ID NO: 10. The allele when present in a spinach plant confers complete resistance to at least *Peronospora farinosa* f. sp. *spinacea* race Pfs: 1, Pfs: 2, Pfs: 5, Pfs: 6, Pfs: 7, Pfs: 9, Pfs: 11, Pfs: 13, Pfs: 15 and Pfs: 17, and does not confer resistance to downy mildew race Pfs: 16.

4 Claims, No Drawings

Specification includes a Sequence Listing.

(56) References Cited

U.S. PATENT DOCUMENTS

| | | | |
|---|---|---|---|
| 2019/0233841 A1 | 8/2019 | Kock et al. | |
| 2019/0241905 A1 | 8/2019 | Kock | |
| 2020/0017875 A1 | 1/2020 | Kock et al. | |
| 2021/0095306 A1 | 4/2021 | De Visser et al. | |

FOREIGN PATENT DOCUMENTS

| | | | | |
|---|---|---|---|---|
| EP | 2912940 | A1 | | 9/2015 |
| WO | 2007/051483 | A1 | | 5/2007 |
| WO | 2013/064436 | A1 | | 5/2013 |
| WO | 2015/036378 | A1 | | 3/2015 |
| WO | 2015/036469 | A1 | | 3/2015 |
| WO | 2015/171603 | A1 | | 11/2015 |
| WO | 2018/059653 | A1 | | 4/2018 |
| WO | 2018/060474 | A1 | | 4/2018 |
| WO | WO 2018/060474 | | * | 4/2018 |

OTHER PUBLICATIONS

Timothy K. Eitas, et al., NB-LRR Proteins: Pairs, Pieces, Perception, Partners, and Pathways, Current Opinion in Plant Biology (2010) 13:472-477.
Feng, et al., Identification of New Races and Deviating Strains of the Spinach Downy Mildew Pathogen *Peronospora farinosa* f. sp. *spinaciae*, Plant Disease (Jan. 2014) 98(1):145-152.
GenBank Accession No. XP_021842255 (Aug. 1, 2017).
Haiwei H. Guo, et al., Protein Tolerance to Random Amino Acid Change, PNAS (Jun. 22, 2004) vol. 101, No. 25, p. 9205-9210.
Charlotte Hallavant, et al., The First Archaeobotanical Evidence of Spinacia Oleracea L. (Spinach) in Late 12th-mid 13th Century A.D. France, French National Centre for Scientific Research, Article: Vegetation History and Archaeobotany, Published online May 21, 2013.
B. M. Irish, et al., Three New Races of the Spinach Downy Mildew Pathogen Identified by a Modified Set of Spinach Differentials, Plant Disease (Nov. 2007) vol. 91, No. 11, p. 1392-1396.
Merriam Webster Definition of "as" Sep. 27, 2016.
Simona Proietti, et al., Increase of Ascorbic Acid Content and Nutritional Quality in Spinach Leaves During Physiological Acclimation to Low Temperature, Plant Physiology and Biochemistry (2009) vol. 47, p. 717-723.

Dong Qi, et al., Recent Advances in Plant NLR Structure, Function, Localization, and Signaling, Frontiers in Immunology (2013) vol. 4, Article 348, p. 1-10.
Hongbing She, et al., Fine Mapping and Candidate Gene Screening of the Downy Mildew Resistance Gene RPF1 in Spinach, Theoretical and Applied Genetics (2018) 131:2529-2541.
Octavina C.A. Sukarta, et al., Structure-Informed Insights for NLR Functioning in Plant Immunity, Seminars in Cell & Developmental Biology (2016) 56:134-149.
Yanming Yang, et al., Transgenic Spinach Plants Expressing the Coat Protein of Cucumber Mosaic Virus, In Vitro Cell Dev. Biol.-Plant (1997) 33:200-204.
J.C. Correll, et al., Spinach: Better Management of Downy Mildew and White Rust Through Genomics, Eur. J. Plant Pathology (Dec. 4, 2010) 129:193-205.
Feng Chunda, et al., Construction of a Spinach Bacterial Artificial Chromosome (BAC) Library as a Resource for Gene Identification and Marker Development, Plant Mol Biol Rep (2015) 33:1996-2005.
B. M. Irish, et al., Characterization of a Resistance Locus (Pfs-1) to the Spinach Downy Mildew Pathogen (*Peronospora farinosa* f. sp. *spinaciae*) and Development of a Molecular Marker Linked to Pfs-1, Pathology, American Phytopathological Society, US (2008) vol. 98, No. 8. p. 894-900.
International Search Report and Written Opinion issued Jan. 30, 2018 in PCT/EP2017/074863.
Moffett et al., Interaction Between Domain of a Plant NBS-LRR Protein in Disease Resistance-Related Cell Death, The EMBO Journal (2002) vol. 21, No. 17, p. 4511-4519.
NCBI Blast (2020) SEQ ID No. 6 v. Patent database.
NCBI Blast (2020) SEQ ID No. 7 v. Patent database.
Monsanto Vegetable IP Management B V: "Spinacia oleracea L. ; SMBS171046 ; smb-s017-1046f", Community Plant Variety Office, CPVO, 3 Boulevard Marechal Foch CS 10121 49101 Angers Cedex 2-France, Feb. 19, 2020.
Peter N. Dodds, et al., Direct protein interaction underlies gene-for-gene specificity and coevolution of the flax resistance genes and flax rust avirulence genes , PNAS (Jun. 6, 2006) vol. 103, No. 23, p. 8888-8893.
Xiaoping Gou, et al., Genome-wide cloning and sequence analysis of leucine-rich repeat receptor-like protein kinase genes in *Arabidopsis thaliana*, BMC Genomics (2010) vol. 11, No. 19, p. 1-15.
Leah McHale, et al., Plant NBSMLRR proteins: adaptable guards, Genome Biology (2006) vol. 7, Issue 4, Article 212, p. 212-212.11.

* cited by examiner

SEQUENCE LISTING

```
Sequence total quantity: 15
SEQ ID NO: 1            moltype = AA  length = 9
FEATURE                 Location/Qualifiers
REGION                  1..9
                        note = N-terminal motif
source                  1..9
                        mol_type = protein
                        organism = Spinacia oleracea
SEQUENCE: 1
MAEIGYSVC                                                                   9

SEQ ID NO: 2            moltype = AA  length = 6
FEATURE                 Location/Qualifiers
REGION                  1..6
                        note = motif
source                  1..6
                        mol_type = protein
                        organism = Spinacia oleracea
SEQUENCE: 2
KWMCLR                                                                      6

SEQ ID NO: 3            moltype = AA  length = 8
FEATURE                 Location/Qualifiers
REGION                  1..8
                        note = motif
source                  1..8
                        mol_type = protein
                        organism = Spinacia oleracea
SEQUENCE: 3
HVGCVVDR                                                                    8
```

```
SEQ ID NO: 4              moltype = DNA  length = 20
FEATURE                   Location/Qualifiers
misc_feature              1..20
                          note = Forward primer LRR domain (Alpha)
source                    1..20
                          mol_type = other DNA
                          organism = synthetic construct
SEQUENCE: 4
acaagtggat gtgtcttagg                                                20

SEQ ID NO: 5              moltype = DNA  length = 19
FEATURE                   Location/Qualifiers
misc_feature              1..19
                          note = Reverse primer LRR domain (Alpha)
source                    1..19
                          mol_type = other DNA
                          organism = synthetic construct
SEQUENCE: 5
ttcgccctca tcttcctgg                                                 19

SEQ ID NO: 6              moltype = DNA  length = 18
FEATURE                   Location/Qualifiers
misc_feature              1..18
                          note = Forward primer LRR domain (Beta)
source                    1..18
                          mol_type = other DNA
                          organism = synthetic construct
SEQUENCE: 6
tcacgtgggt tgtgttgt                                                  18

SEQ ID NO: 7              moltype = DNA  length = 1597
FEATURE                   Location/Qualifiers
misc_feature              1..1597
                          note = Amplicon of LRR domain of the beta-WOLF 0 allele
source                    1..1597
                          mol_type = genomic DNA
                          organism = Spinacia oleracea
SEQUENCE: 7
tcacgtgggt tgtgttgtcg atagagatcc agaaatagtc tttttatgta gcaataagat    60
tcgttcgtat attagcggtc gctgcataaa gaatccggtg gattcacaaa tagcaactg    120
gatgtgcctt agggtgttgg acttgtcaga ttcatgtgtt aaagatttgt ctgattcaat   180
aggtaagctg ctgcacttaa ggtatcttaa cctctcttct aatataaagt tggagataat   240
ccctgatgca attacaagac tgcataactt gcagacacta cttttagaag attgcagaag   300
tttaaaggag ttgccaaaag attttttgcaa attggtcaaa ctgaggcact tggaattaca   360
gggttgtcat gatttgattg gtatgtcatt tggaatggat aagctaacta gtcttagaat   420
actaccaaac atttgtggtgg gtaggaagga acaaagtgtt gatgatgagc tgaaagccct   480
aaaaggcctc accgagataa aaggctccat tgatatcaca atctattcaa aatatagaag   540
agttgaaggc atgaatggca caggaggagg agctgggtat ttgaagagca tgaaacatct   600
cacgggggtt aatattacat ttgatgaagg tggatgtgtt aaccctgaag ctgtgtattt   660
gaagagcatg aaacatctca cgagggttat tattatattt gattataaag tggatgtgt   720
taaccctgaa gctgtgttgg caccctaga gccaccttca aatatcaaga ggttagagat   780
gtggcattac agtggtacaa caattccagt atggggaaga gcagagatta attgggcaat   840
ctccctctca catcttgtcg acatcacgct tgaagattgt tacaatttgc aggagatgcc   900
agtgctgagt aaactgcctc atttgaaatc actggaactt acagagttgg ataacttaga   960
gtacatggag agtagaagca gcagcagtag cagtgacaca gaagcagcaa caccagaatt   1020
accaacattc ttcccttccc ttgaaaaact tacactttgg cgtctggaca agttgaaggg   1080
ttttgggaac aggagatcga gtagttttcc ccgcctctct aaattggaaa tctggaaatg   1140
tccagatcta acgtcatttc cttcttgtcc aagccttgaa gagttggaat tgaaagaaaa   1200
caatgaagcg ttgcaaataa tagtaaaaat aacaacaaca agaggtaaag aagaaaaaga   1260
agaagacaag aatgctggtg ttggaaattc acaagatgat gacaatgtca aatttatggaa   1320
ggtgaaaata gacaatctgg gttatctcaa atcactgccc acaaattgtc tgactcacct   1380
cgaccttaca ataagtgatt ccaaggaggg ggagggtgaa tgggaagttg gggatgcatt   1440
tcagaagtgt gtatcttctt tgagaagcct caccataatc ggaaatcacg gaataaataa   1500
agtgaagaga ctgtctggaa gaacagggtt ggagcatttc actctgttgg aatcactcaa   1560
actttcagat atagagacc aggaagatga gggcgaa                             1597

SEQ ID NO: 8              moltype = AA  length = 532
FEATURE                   Location/Qualifiers
REGION                    1..532
                          note = Amino acid sequence encoded by amplicon of LRR
                            domain Beta Wolf 0(Viroflay)
source                    1..532
                          mol_type = protein
                          organism = Spinacia oleracea
SEQUENCE: 8
HVGCVVDRDP EIVFLCSNKI RSYISGRCIK NPVDSQIDNW MCLRVLDLSD SCVKDLSDSI    60
GKLLHLRYLN LSSNIKLEII PDAITRLHNL QTLLLEDCRS LKELPKDFCK LVKLRHLELQ   120
GCHDLIGMSF GMDKLTSLRI LPNIVVGRKE QSVDDELKAL KGLTEIKGSI DITIYSKYRR   180
```

-continued

```
VEGMNGTGGG AGYLKSMKHL TGVNITFDEG GCVNPEAVYL KSMKHLTRVI IIFDYKGGCV 240
NPEAVLATLE PPSNIKRLEM WHYSGTTIPV WGRAEINWAI SLSHLVDITL EDCYNLQEMP 300
VLSKLPHLKS LELTELDNLE YMESRSSSSS SDTEAATPEL PTFFPSLEKL TLWRLDKLKG 360
FGNRRSSSFP RLSKLEIWKC PDLTSFPSCP SLEELELKEN NEALQIIVKI TTTRGKEEKE 420
EDKNAGVGNS QDDDNVKLWK VEIDNLGYLK SLPTNCLTHL DLTISDSKEG EGEWEVGDAF 480
QKCVSSLRSL TIIGNHGINK VKRLSGRTGL EHFTLLESLK LSDIEDQEDE GE         532

SEQ ID NO: 9            moltype = DNA   length = 1385
FEATURE                 Location/Qualifiers
misc_feature            1..1385
                        note = Amplicon of LRR domain of the alpha-WOLF 24 allele
source                  1..1385
                        mol_type = genomic DNA
                        organism = Spinacia oleracea
SEQUENCE: 9
acaagtggat gtgtcttagg atgttggact tgtcaaggtc ggatgttaaa aatttgccta 60
attcaatagg taaattgttg cacttgaggt atcttaacct gtcagataat agaaatctaa 120
agatacttcc tgatgcaatt acaagactgc ataatttgca gacacttctt ttagtagatt 180
gcagaagttt aaaggagttg ccaaaagatt tttgcaaatt ggtcaaactg aggcacttgg 240
aattacaggg ttgtcatgat ttgattggta tgccatttgg aatggataag ctaactagtc 300
ttagagtact accaaaagtt gtggtgggta agaaggaaca aagtgatgat cagctgaaag 360
cctaaaagg cctcaccgag ataaaaggct ccattgcact cacaatctat tcaaagtata 420
gaatagttga aggcatgaat gacacaggag gagctgggca tttgaagagc atgaaacatc 480
tcacgggggt tgatattaca ttttgggtg aatgtgttaa ccctgaagct gtgttggcaa 540
ccctagagcc accttcaaat atcaagagct tatctataca tcgttttgat ggtaaaacac 600
ttccagtatg gggaagagca gagattaatt gggcaattcc cctctcacat cttgtcgaca 660
tcaagcttag ttgttgtcgt aatttgcagg agatgccagt gctgagtaaa ctgcctcatt 720
tgaaatcact ggaacttcga tgtttggaaa acttagagta catggagagt agaagcagca 780
gcagtagcag tgacaaagaa gcagcaacac cagaattacc aacattcttc ccttcccttg 840
aaaaacttac actttggtat ctggaaaagt tgaagggttt ggggaacagg agatcgagta 900
gtttctcccg cctctctaaa ttggaaatcc gggaatgccc agatctaacg tggttcctc 960
cttgtccaag ccttgaaacg ttgaaattgg aaaaaaacaa tgaagcgttg caaaaaataa 1020
caacaacaag aggtaaagaa gaaaaagaag aagacaagaa tgctggtgtt ggaaattcac 1080
aagatgatga caatgtcaaa ttacggaagg tgaaaataga caatctgggt tatctcaaat 1140
cactgcccac aaattgtctt actcacctcg accttacaat aagagattcc aaggaggggg 1200
agggtgaatg ggaagttggg gatgcatttc agaagtgtgt atcttctttg agaagcctca 1260
ccataatcgg aaatcacgga ataaataaag tgaagagact gtctggaaga acagggttgg 1320
agcatttcac tctgttggac tcactcaaat tttcaaagat agaagaccag gaagatgagg 1380
gcgaa                                                             1385

SEQ ID NO: 10           moltype = AA   length = 461
FEATURE                 Location/Qualifiers
REGION                  1..461
                        note = Amino acid sequence encoded by amplicon of LRR
                         domain ofalpha-WOLF 24
source                  1..461
                        mol_type = protein
                        organism = Spinacia oleracea
SEQUENCE: 10
KWMCLRMLDL SRSDVKNLPN SIGKLLHLRY LNLSDNRNLK ILPDAITRLH NLQTLLLVDC 60
RSLKELPKDF CKLVKLRHLE LQGCHDLIGM PFGMDKLTSL RVLPKVVVGK KEQSDDQLKA 120
LKGLTEIKGS IDITIYSKYR IVEGMNDTGG AGYLKSMKHL TGVDITFLGE CVNPEAVLAT 180
LEPPSNIKSL SIHRFDGKTL PVWGRAEINW AISLSHLVDI KLSCCRNLQE MPVLSKLPHL 240
KSLELRCLEN LEYMESRSSS SSSDKEAATP ELPTFFPSLE KLTWYLEKL KGLGNRRSSS 300
FPRLSKLEIR ECPDLTWFPP CPSLETLKLE KNNEALQKIT TTRGKEEKEE DKNAGVGNSQ 360
DDDNVKLRKV KIDNLGYLKS LPTNCLTHLD LTIRDSKEGE GEWEVGDAFQ KCVSSLRSLT 420
IIGNHGINKV KRLSGRTGLE HFTLLDSLKF SKIEDQEDEG E                      461

SEQ ID NO: 11           moltype = DNA   length = 3453
FEATURE                 Location/Qualifiers
misc_feature            1..3453
                        note = Coding sequence of the alpha-WOLF 24 allele
source                  1..3453
                        mol_type = genomic DNA
                        organism = Spinacia oleracea
SEQUENCE: 11
atggccgaaa tcggatactc ggtttgtgcg aaactcatcg aagtgattgg cagtgagctg 60
atcaaagaga tttgtgacac atggggttac aaatctcttc ttgaggacct caacaaaact 120
gtattgacgg tcaggaacgt tctcattcaa gccggggtga tgcgggagct tactagtgaa 180
caacaaggtt tcattgcaga ccttaaagat gttgtttatg atgctgatga cttgttcgac 240
aagttactca ctcgtgctga gcgaaaacag attgatgaa acgaaatctc tgaaaagta 300
cgtcgttct tttcctctag taacaagatc ggtcaagctt actacatgtc tcgtaaggtt 360
aaggaaatta agaagcagtt ggatgaaatt gttgataggc atacaaaatt tgggtttagt 420
gctgagttta tacctgtttg taggggaagg ggaaacgaaa gggaaacacg ttcatatata 480
gatgtcaaga atattcttgg gagggataaa gataagaatg atatcaataa tagtttgctt 540
aatcgtaatg gtaatgaagc ttgtagttcc ctgaccatag tgggagcggg aggattggga 600
aaaactgctc ttgcacaact tgtgttcaat gatgaaaggg tcaaaattga gttccatgat 660
ttgaggtatt gggttttgtt ctctgatcaa gatgggggcc aatttgatgt gaagaaatc 720
ctttgtaaga ttttagaggt ggttactaag gagaaagttg ataatagttc cacattggaa 780
```

```
ttggtacaaa gccaatttca agagaagtta agaggaaaga agtacttcct tgttcttgat    840
gatgtatgga acgaggatcg tgagaagtgg cttcctttgg aagagttgtt aatgttgggt    900
caaggggggaa gcaaggttgt agtgaccaca cgttcagaga agacagcaaa tgtcataggg    960
aaaagacatt tttatacact ggaatgtttg tcaccagatt attcatggag cttatttgaa   1020
atgtcggctt ttcagaaagg gcatgagcag gaaaaccatc acgaactagt tgatattggg   1080
aaaaagattg ttgaaaaatg ttataacaat ccacttgcta taacggtggt aggaagtctt   1140
ctttatggag aggagataag taagtggcgg tcatttgaaa tgagtgagtt ggccaaaatt   1200
ggcaatgggg ataataagat tttgccgata ttaaagctca gttaccataa tcttataccc   1260
tcgttgaaga gttgttttag ttattgtgca gtgtttccca aggatcatga aataaagaag   1320
gagatgttga ttgaacttgtg gatgcacaa ggatatgttg tgccgttgga tggaggtcaa   1380
agtatagaag atgctgccga ggaacatttt gtaattttgt tacgaaggtg tttctttcaa   1440
gatgtaaaga aggataaata tggtgatgtt gattctgtta aaatccacga cttgatgcac   1500
gatgtcgccc aagaagtggg gagggaggaa ttatgtgtag tgaatgataa tacaaagaac   1560
tgggtgata aaatccgtca tgtacatcgt gatgtcatta gatatgcaca aagagtctct   1620
ctgtgtagcc atagccataa gattcgttcg tatattggtg gtaattgtga aaaacgttgt   1680
gtggatacac taatagacaa gtggatgtgt cttaggatgt tggacttgtc aaggtcggat   1740
gttaaaaatt tgcctaattc aataggtaaa ttgttgcact tgaggtatct taacctgtca   1800
gataatagaa atctaaagat acttcctgat gcaattacaa gactgcataa tttgcagaca   1860
cttcttttag tagattgcag aagtttaaag gagttgccaa aagattttttg caaattggtc   1920
aaaactgaggc acttggaatt acagggttgt catgatttga ttggtatgcc atttggaatg   1980
gataagctaa ctagtcttag agtactacca aaagttgtgg tgggtaagaa ggaacaaagt   2040
gatgatcagc tgaaagccct aaaaggcctc accgagataa aaggctccat tgatatcaca   2100
atctattcaa agtatagaat agttgaaggc atgaatgaca caggaggagc tgggtatttg   2160
aagagcatga acatctcac ggggggttgat attacatttt tgggtgaatg tgttaaccct   2220
gaagctgtgt tggcaaccct agagccacct tcaaatatca agagcttatc tatacatcgt   2280
tttgatggta aaacacttcc agtatggggta agagcagaga ttaattgggc aatctccctc   2340
tcacatcttg tcgacatcaa gcttagttgt tgtcgtaatt tgcaggagat gccagtgctg   2400
agtaaactgc ctcatttgaa atcactggaa cttcgatgtt tggaaaactt agagtacatg   2460
gagagtagaa gcagcagcag tagcagtgac aaagaagcag caacaccaga attaccaaca   2520
ttcttccctt cccttgaaaa acttacactt tggtatctgg aaaagttgaa gggttttgggg   2580
aacaggagat cgagtagttt tccccgcctc tctaaattgg aaatccggga atgcccagat   2640
ctaacgtggt tcctccttg tccaagcctt gaaacgttga aattggaaaa aacaatgaa    2700
gcgttgcaaa aaataacaac aacaagaggt aagaagaaa aagaagaaga caagaatgct   2760
ggtgttggaa attcacaaga tgatgacaat gtcaaattac ggaaggtgaa aatagacaat   2820
ctgggtttatc tcaaatcact gcccacaaat tgtcttactc acctcgacct tacaataaga   2880
gattccaagg agggggaggg tgaatggaa gttggggatg catttcagaa gtgtgtatct   2940
tctttgagaa gcctcaccat aatcggaaat cacggaataa ataaagtgaa gagactgtct   3000
ggaagaacag ggttggagca tttcactctg ttggactcac tcaatttttc aaagatagaa   3060
gaccaggaag atgagggcga agacaacatc atgttctgga aaaccttttcc tcaaaacctc   3120
cgcagtttga gaattaaaga ctctgacaaa atgacaagtt tgcccatggg gatgcagtac   3180
ttaacctccc tccaaaccct ctatctacac cattgttatg aattgaattc ccttccagaa   3240
tggataagca gcttatcatc tcttcaatcc ctgtacatat acaaatgtcc agccctaaaa   3300
tcactaccag aagcaatgcg gaacctcacc tccccttcaga gcctgtgat acggcggtgt   3360
ccagacctaa ttgaaagatg cgaagaaccc aacggcgagg actatcccaa aattcgacac   3420
atctccagaa ttgtactaaa tgaatattgg tga                                3453
```

```
SEQ ID NO: 12            moltype = AA   length = 1150
FEATURE                  Location/Qualifiers
REGION                   1..1150
                         note = Amino acid sequence of the alpha-WOLF 24 allele
source                   1..1150
                         mol_type = protein
                         organism = Spinacia oleracea
SEQUENCE: 12
MAEIGYSVCA KLIEVIGSEL IKEICDTWGY KSLLEDLNKT VLTVRNVLIQ AGVMRELTSE    60
QQGFIADLKD VVYDADDLFD KLLTRAERKQ IDGNEISEKV RRFFSSSNKI GQAYYMSRKV   120
KEIKKQLDEI VDRHTKFGFS AEFIPVCRGR GNERETRSYI DVKNILGRDK DKNDIIDRLL   180
NRNGNEACSF LTIVGAGGLG KTALAQLVFN DERVKIEFHD LRYWVCVSDQ DGGQFDVKEI   240
LCKILEVVTK EKVDNSSTLE LVQSQFQEKL RGKKYFLVLD DVWNEDREKW LPLEELLMLG   300
QGGSKVVVTT RSEKTANVIG KRHFYTLECL SPDYSWSLFE MSAFQKGHEQ ENHHELVDIG   360
KKIVEKCYNN PLAITVVGSL LYGEEISKWR SFEMSELAKI GNGDNKILPI LKLSYHNLIP   420
SLKSCFSYCA VFPKDHEIKK EMLIELWMAQ GYVVPLDGGQ SIEDAAEEHF VILLRRCFFQ   480
DVKKDKYGDV DSVKIHDLMH DVAQEVGREE LCVVNDNTKN LGDKIRHVHR DVIRYAQRVS   540
LCSHSHKIRS YIGGNCEKRC VDTLIDKWMC LRMLDLSRSD VKNLPNSIGK LLHLRYLNLS   600
DNRNLKILPD AITRLHNLQT LLLVDCRSLK ELPKDFCKLV KLRHLELQGC HDLIGMPFGM   660
DKLTSLRVLP KVVVGKKEQS DDQLKALKGL TEIKGSIDIT IYSKYRIVEG MNDTGGAGYL   720
KSMKHLTGVD ITFLGECVNP EAVLATLEPP SNIKSLSIHR FDGKTLPVWG RAEINWAISL   780
SHLVDIKLSC CRNLQEMPVL SKLPHLKSLE LRCLENLEYM ESRSSSSSSD KEAATPELPT   840
FFPSLEKLTL WYLEKLKGLG NRRSSSFPRL SKLEIRECPD LTWFPPCPSL ETLKLEKNNE   900
ALQKITTTRG KEEKEEDKNA GVGNSQDDDN VKLRKVKIDN LGYLKSLPTN CLTHLDLTIR   960
DSKEGEGEWE VGDAFQKCVS SLRSLTIIGN HGINKVKRLS GRTGLEHFTL LDSLKFSKIE  1020
DQEDEGEDNI MFWKTFPQNL RSLRIKDSDK MTSLPMGMQY LTSLQTLYLH HCYELNSLPE  1080
WISSLSSLQS LYIYKCPALK SLPEAMRNLT SLQSLVIRRC PDLIERCEEP NGEDYPKIRH  1140
ISRIVLNEYW                                                       1150

SEQ ID NO: 13            moltype = AA   length = 9
FEATURE                  Location/Qualifiers
REGION                   1..9
                         note = motif
```

```
source                  1..9
                        mol_type = protein
                        organism = Spinacia oleracea
SEQUENCE: 13
DQEDEGEDN                                                                      9

SEQ ID NO: 14           moltype = DNA  length = 30
FEATURE                 Location/Qualifiers
misc_feature            1..30
                        note = forward primers standard amplification sequence
source                  1..30
                        mol_type = other DNA
                        organism = synthetic construct
SEQUENCE: 14
gcagtcgaac atgtagctga ctcaggtcac                                              30

SEQ ID NO: 15           moltype = DNA  length = 30
FEATURE                 Location/Qualifiers
misc_feature            1..30
                        note = reverse primer standard amplification sequence
source                  1..30
                        mol_type = other DNA
                        organism = synthetic construct
SEQUENCE: 15
tggatcactt gtgcaagcat cacatcgtag                                              30
```

PERONOSPORA RESISTANCE IN SPINACIA OLERACEA

RELATED APPLICATIONS AND INCORPORATION BY REFERENCE

This application is a continuation-in-part application of international patent application Serial No. PCT/EP2021/056388 filed 12 Mar. 2021, which published as PCT Publication No. WO 2021/180949 on 16 Sep. 2021, which claims benefit of international patent application Serial No. PCT/EP2020/056739 filed 12 Mar. 2020.

The foregoing applications, and all documents cited therein or during their prosecution ("appln cited documents") and all documents cited or referenced in the appln cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention. More specifically, all referenced documents are incorporated by reference to the same extent as if each individual document was specifically and individually indicated to be incorporated by reference.

SEQUENCE STATEMENT

The instant application contains a Sequence Listing which has been submitted electronically and is hereby incorporated by reference in its entirety. Said ASCII copy was created Mar. 12, 2021, and amended on Aug. 2, 2022 is named Y7954_00526SL.xml and is 71,213 bytes in size.

FIELD OF THE INVENTION

The invention relates to a gene capable of conferring resistance to a spinach plant against one or more *Peronospora farinosa* f. sp. *spinaciae* races. The invention also relates to a spinach plant, to propagation material of said spinach plant, to a cell of said spinach plant, and to seed of said spinach plant carrying the gene. The invention further relates to a method of producing a spinach plant carrying the gene and to the use of the gene in breeding to confer resistance against *Peronospora farinosa* f. sp. *spinaciae*.

BACKGROUND OF THE INVENTION

Downy mildew (*Peronospora farinosa* f. sp. *spinaciae*) is a major threat for spinach growers because it directly affects the harvested leaves. In spinach, downy mildew is caused by the oomycete *Peronospora farinosa* f. sp. *spinaciae* (formerly known as *P. effusa*). Infection makes the leaves unsuitable for sale and consumption, as it manifests itself phenotypically as yellow lesions on the older leaves, and on the abaxial leaf surface a greyish fungal growth can be observed. The infection can spread very rapidly, and it can occur both in glasshouse cultivation and in soil cultivation. The optimal temperature for formation and germination of *P. farinosa* f. sp. *spinaciae* spores is 9 to 12° C., and it is facilitated by a high relative humidity. When spores are deposited on a humid leaf surface they can readily germinate and infect the leaf. Fungal growth is optimal between 8 and 20° C. and a relative humidity of ≥80%, and within 6 and 13 days after infection mycelium growth can be observed. Oospores of *P. farinosa* can survive in the soil for up to 3 years, or as mycelium in seeds or living plants.

To date 17 pathogenic races of spinach downy mildew (Pfs) have been officially identified and characterized, and many new candidates are observed in the field. The 17 officially recognized races of *Peronospora farinosa* f. sp. *spinaciae*, are designated Pfs: 1 to Pfs: 17 (Irish et al. Phtypathol. Vol. 98 pg. 894-900, 2008; Plantum NL (Dutch association for breeding, tissue culture, production and trade of seed and young plants) press release, "Benoeming van Pfs: 14, een nieuwe fysio van valse meeldauw in spinazie", Sep. 19, 2012; Report Jim Correl (Univ. Arkansas) and Steven Koike (UC Cooperative Extension, Monterey County), "Race Pfs: 14-Another new race of the spinach downy mildew pathogen", Sep. 18, 2012; Plantum NL press release, "Denomination of Pfs: 15, a new race of downy mildew in spinach", Sep. 2, 2014; Plantum NL press release, "Denomination of Pfs: 16, a new race of downy mildew in spinach, Mar. 15, 2016; Plantum NL press release, Denomination of Pfs: 17, a new race of downy mildew in spinach", Apr. 16, 2018). Races 4 to 16 were identified between 1990 and 2014, while only recently two new *Peronospora* isolates have been identified, termed UA201519B and US1602, which subsequently have been officially named Pfs: 16 and Pfs: 17 by the International Working Group on *Peronospora* (IWGP) (Plantum NL (Dutch association for breeding, tissue culture, production and trade of seed and young plants) press release, "Denomination of Pfs: 16, a new race of downy mildew in spinach", Mar. 15, 2016; Plantum NL press release, Denomination of Pfs: 17, a new race of downy mildew in spinach", Apr. 16, 2018. All 17 officially recognized Pfs races are publicly available from the Department of Plant Pathology, University of Arkansas, Fayetteville, AR 72701, USA, and also from NAK Tuinbouw, Sotaweg 22, 2371 GD Roelofarendsveen, the Netherlands).

Especially the latest identified *Peronospora* races can break the resistance of many spinach varieties that are currently used commercially worldwide, and they thus pose a serious threat to the productivity of the spinach industry. Therefore, it is crucial to stay at the forefront of developments in this field, as *Peronospora* continuously develops the ability to break the resistances that are present in commercial spinach varieties. For this reason new resistance genes against downy mildew are very valuable assets, and they form an important research focus in breeding and particular in spinach and lettuce breeding. One of the main goals of spinach breeders is to rapidly develop spinach varieties with a resistance to as many *Peronospora* races as possible, including the latest identified races, before these races become wide-spread and pose a threat to the industry.

In commercial spinach varieties resistance against downy mildew is usually caused by so-called R-genes. R-gene mediated resistance is based on the ability of a plant to recognize the invading pathogen. In many cases this recognition occurs after the pathogen has established the first phases of interaction and transferred a so called pathogenicity (or avirulence) factor into the plant cell. These pathogenicity factors interact with host components in order to establish conditions which are favorable for the pathogen to invade the host and thereby cause disease. When a plant is able to recognize the events triggered by the pathogenicity factors a resistance response can be initiated. In many different plant pathogen interaction systems such as the interaction of spinach with different downy mildew strains, the plant initiates these events only after specific recognition of the invading pathogen.

Co-evolution of plant and pathogen has led to an arms race in which an R-gene mediated resistance is sometimes overcome as a consequence of the capability of the pathogen to interact with and modify alternative host targets or the same targets in a different way, such that the recognition is lost and infection can be established successfully resulting in disease. In order to re-establish resistance in a plant, a new R-gene has to be introduced which is able to recognize the mode of action of an alternative pathogenicity factor.

Despite the fact that the durability of R-genes is relatively low, R-genes are in spinach still the predominant form of defense against downy mildew. This is mainly due to the fact that it is the only form of defense that gives absolute resistance. So far plant breeders have been very successful in generating downy mildew resistant spinach varieties by making use of resistance genes residing in the wild germplasm of the crop species. Even though R-genes are extensively used in spinach breeding, until now not much is known of these R-genes.

Citation or identification of any document in this application is not an admission that such document is available as prior art to the present invention.

SUMMARY OF THE INVENTION

Only recently it was discovered that the R-genes officially recognized in spinach are in fact all different alleles of the two tightly linked genes, the alpha- and the beta-WOLF genes. This was also the first time that R-genes, or better R-alleles were for the first time characterized at the molecular level, i.e. their nucleotide and amino acid sequence was determined. Although this provides the breeder with tools that increase the efficiency of detecting and selecting R-alleles, adequately responding to newly emerging downy mildew races is still crucial for developing commercially successful spinach varieties.

Therefore, it is the object of the invention to provide a new resistance allele conferring resistance to a newly emerged downy mildew isolate and to provide molecular biological tools for identifying this new resistance allele.

In the research leading to the present invention, a new allelic variant of the Alpha-WOLF gene as described in WO2018059651 was found. The alpha-WOLF gene encodes a protein that belongs to the CC-NBS-LRR family (Coiled Coil-Nucleotide Binding Site-Leucine-Rich Repeat). Depending on the allelic variant (or the allelic variants) that is (are) present in a spinach plant, said plant will produce a variant of the WOLF protein that confers a certain resistance profile to pathogenic races of *Peronospora farinosa* f. sp. *spinaciae*.

In the context of this invention the term "allele" or "allelic variant" is used to designate a version of the gene that is linked to a specific phenotype, i.e. resistance profile. It was found that a spinach plant may carry one or two WOLF genes. Each of these two WOLF genes encompasses multiple alleles, each allele conferring a particular resistance profile. In the context of this invention an allele or allelic variant is a nucleic acid.

The beta WOLF gene is located on scaffold12735 (sequence: GenBank: KQ143339.1), at position 213573-221884. In case the spinach plant also carries or only carries the alpha-WOLF gene, the alpha-WOLF gene is located at approximately the same location as where the beta-WOLF gene is located on scaffold12735 in the Viroflay genome assembly.

The newly found alpha-WOLF allele provides at least resistance to downy mildew race Pfs: 7.

Accordingly, it is an object of the invention not to encompass within the invention any previously known product, process of making the product, or method of using the product such that Applicants reserve the right and hereby disclose a disclaimer of any previously known product, process, or method. It is further noted that the invention does not intend to encompass within the scope of the invention any product, process, or making of the product or method of using the product, which does not meet the written description and enablement requirements of the USPTO (35 U.S.C. § 112, first paragraph) or the EPO (Article 83 of the EPC), such that Applicants reserve the right and hereby disclose a disclaimer of any previously described product, process of making the product, or method of using the product. It may be advantageous in the practice of the invention to be in compliance with Art. 53(c) EPC and Rule 28(b) and (c) EPC. All rights to explicitly disclaim any embodiments that are the subject of any granted patent(s) of applicant in the lineage of this application or in any other lineage or in any prior filed application of any third party is explicitly reserved. Nothing herein is to be construed as a promise.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

These and other embodiments are disclosed or are obvious from and encompassed by, the following Detailed Description.

DEPOSITS

Seeds that comprise the alpha-WOLF 24 allele of the invention in its genome homozygously were deposited with NCIMB Ltd, Ferguson Building, Craibstone Estate, Bucksburn, Aberdeen AB21 9YA, UK, on 17 Jan. 2020, under accession number NCIMB 43554. The Deposits with NCIMB Ltd, under deposit accession number 43554 were made and accepted pursuant to the terms of the Budapest Treaty. Upon issuance of a patent, all restrictions upon the deposit will be removed, and the deposit is intended to meet the requirements of 37 CFR §§ 1.801-1.809. The deposit will be irrevocably and without restriction or condition released to the public upon the issuance of a patent and for the enforceable life of the patent. The deposit will be maintained in the depository for a period of 30 years, or 5 years after the last request, or for the effective life of the patent, whichever is longer, and will be replaced if necessary during that period.

DETAILED DESCRIPTION OF THE INVENTION

A genome assembly for spinach variety Viroflay—which is susceptible to all known pathogenic races of *Peronospora farinosa* f. sp. *spinaciae*—is publicly available (*Spinacia oleracea* cultivar SynViroflay, whole genome shotgun sequencing project; Bioproject: PRJNA41497; GenBank: AYZV00000000.2; BioSample: SAMN02182572, see also Dohm et al, 2014, *Nature* 505:546-549). In this genome assembly for Viroflay, the beta-WOLF gene is located on scaffold12735 (sequence: GenBank: KQ143339.1), at position 213573-221884. The sequence covered by this interval may comprise the entire genomic sequence of the beta-WOLF gene of Viroflay, plus 2000 basepairs sequence upstream from the gene, plus the sequence downstream from the gene, up to the locus of the neighbouring gene that is situated downstream from the WOLF gene. Spinach variety Viroflay only possesses a single WOLF gene, namely a beta-WOLF gene, but most other spinach lines harbor a single alpha-type WOLF gene at the same location in the genome. Other spinach lines harbor two WOLF genes at approximately the same location in the genome. In such cases, the two WOLF genes are positioned adjacent to each other. In most spinach lines that harbor two WOLF genes, one of said WOLF genes belongs to the alpha-type, and the other WOLF gene belongs to the beta-type. It was observed that this allelic variation in the WOLF locus is responsible for differences in resistance to pathogenic races of *Peronospora farinosa* f. sp. *spinaciae*.

The difference between an allele of an alpha-WOLF gene and an allele of a beta-WOLF gene lies in the presence of specific conserved amino acid motifs in the encoded protein sequence. As mentioned above, all WOLF proteins possess—from N- to C-terminus—the following domains that are generally known in the art: a coiled coil domain (RX-CC-like, cd14798), an NBS domain (also referred to as "NB-ARC domain", pfam00931; van der Biezen & Jones, 1998, *Curr. Biol.* 8: R226-R228), and leucine-rich repeats (IPR032675) which encompass the LRR domain. In addition, all WOLF proteins comprise in their amino acid sequence the motif "MAEIGYSVC" (SEQ ID NO: 1) at the N-terminus. In addition to this, all alpha-WOLF proteins comprise the motif "KWMCLR" (SEQ ID NO: 2) in their amino acid sequence, whereas all beta-WOLF proteins comprise the motif "HVGCVVDR" (SEQ ID NO: 3) in their amino acid sequence.

The present invention relates to a new *Peronospora farinosa* f. sp. *spinaciae* resistance conferring allele of the alpha-WOLF gene designated alpha-WOLF 24.

In particular, the invention relates to a *Peronospora farinosa* f. sp. *spinaciae* resistance conferring allele designated alpha-WOLF 24 wherein the protein encoded by said allele is a CC-NBS-LRR protein that may comprise in its amino acid sequence: a) the motif "MAEIGYSVC" (SEQ ID NO: 1) at its N-terminus; and b) the motif "KWMCLR" (SEQ ID NO: 2); and wherein the LRR domain of the protein has in order of increased preference at least 95%, 96%, 97%, 98%, 98.2%, 98.5%, 98.8%, 99%, 99.2%, 99.5%, 99.8%, 100% sequence similarity to SEQ ID NO: 10. Additionally, the alpha-WOLF 24 allele may comprise an additional motif in its amino acid sequence, namely "DQEDEGEDN".

The invention further relates to a *Peronospora farinosa* f. sp. *spinaciae* resistance conferring allele designated alpha-WOLF 24 wherein the protein encoded by said allele is a CC-NBS-LRR protein that may comprise in its amino acid sequence: a) the motif "MAEIGYSVC" (SEQ ID NO: 1) at its N-terminus; and b) the motif "KWMCLR" (SEQ ID NO: 2); and wherein the LRR domain of the protein has in order of increased preference at least 93%, 94%, 95%, 96%, 97%, 98%, 98.2%, 98.5%, 98.8%, 99%, 99.2%, 99.5%, 99.8%, 100% sequence identity to SEQ ID NO: 10. Additionally, the alpha-WOLF 24 allele may comprise an additional motif in its amino acid sequence, namely "DQEDEGEDN".

The invention also relates to an alpha-WOLF 24 allele having an LRR domain which has a genomic sequence that in order in order of increased preference has at least 93%, 93.5%, 94%, 94.5%, 95%, 95.5%, 96%, 96.5%, 97%, 97.5%, 98%, 98.5%, 99%, 99.1%, 99.2%, 99.3%, 99.4%, 99.5%, 99.6%, 99.7%, 99.8%, 99.9%, 100% sequence similarity to SEQ ID NO: 9.

The invention also relates to an alpha-WOLF 24 allele having an LRR domain which has a genomic sequence that in order of increased preference has at least 95%, 95.5%, 96%, 96.5%, 97%, 97.5%, 98%, 98.5%, 99%, 99.1%, 99.2%, 99.3%, 99.4%, 99.5%, 99.6%, 99.7%, 99.8%, 99.9%, 100% sequence identity to SEQ ID NO: 9.

For the purpose of this invention, the LRR domain of the protein of the alpha-WOLF 24 allele is defined as the amino acid sequence that in order of increased preference has at least 95%, 95.5%, 96%, 96.5%, 97%, 97.5%, 98%, 98.2%, 98.5%, 99.8%, 99%, 99.2%, 99.5%, 99.8%, 100% sequence similarity to SEQ ID NO: 10.

For the purpose of this invention, the LRR domain of the protein of the alpha-WOLF 24 allele is defined as the amino acid sequence that in order of increased preference has at least 95%, 95.5%, 96%, 96.5%, 97%, 97.5%, 98%, 98.2%, 98.5%, 99.8%, 99%, 99.2%, 99.5%, 99.8%, 100% sequence identity to SEQ ID NO: 10.

The skilled person is familiar with methods for the calculation of sequence similarity and sequence identity. Sequence similarity for an amino acid sequence is calculated using EMBOSS stretcher 6.6.0 (ebi.ac.uk/Tools/psa/emboss_stretcher), using the EBLOSUM62 matrix with settings Gap open: 12 and Gap extend: 2. In case of DNA, sequence similarity is calculated using the DNA full matrix with settings Gap open: 16 and Gap extend: 4.

The LRR domain of the alpha-WOLF 24 allele as defined herein can be determined by amplifying and sequencing the genomic DNA encoding for the amino acid sequence of LRR domain using specific primers, and subsequently translating the DNA sequence into an amino acid sequence, thereby applying common sense in choosing the correct reading frame. The skilled person is capable of doing this, using freely available online bioinformatics tools such as can be found here: web.expasy.org/translate/.

The genomic sequence of a LRR domain of an alpha-WOLF gene such as alpha-WOLF 24 can be amplified using a primer pair having a forward primer which is a nucleic acid molecule having the sequence of SEQ ID NO: 4 and a reverse primer which is a nucleic acid molecule having the sequence of SEQ ID NO: 5.

The invention also relates to a nucleic acid molecule which confers resistance to at least one *Peronospora farinosa* f. sp. *spinacea* race, wherein the protein encoded by said nucleic acid molecule is a CC-NBS-LRR protein that may comprise in its amino acid sequence: a) the motif "MAEIGYSVC" (SEQ ID NO: 1) at its N-terminus; and b) the motif "KWMCLR" (SEQ ID NO: 2); and wherein the LRR domain of the protein has in order of increased preference at least 95%, 96%, 97%, 98%, 98.2%, 98.5%, 98.8%, 99%, 99.2%, 99.5%, 99.8%, 100% sequence similarity to SEQ ID NO: 10. Optionally this nucleic acid molecule is an isolated nucleic acid molecule.

The invention also relates to a nucleic acid molecule which confers resistance to at least one *Peronospora farinosa* f. sp. *spinacea* race, wherein the protein encoded by said nucleic acid molecule is a CC-NBS-LRR protein that may comprise in its amino acid sequence: a) the motif "MAEIGYSVC" (SEQ ID NO: 1) at its N-terminus; and b) the motif "KWMCLR" (SEQ ID NO: 2); and wherein the LRR domain of the protein has in order of increased preference at least 93%, 94%, 95%, 96%, 97%, 98%, 98.2%, 98.5%, 98.8%, 99%, 99.2%, 99.5%, 99.8%, 100% sequence identity to SEQ ID NO: 10. Optionally this nucleic acid molecule is an isolated nucleic acid molecule.

The allele shows a segregation pattern that is consistent with that of a dominant inheritance for the resistance it confers to downy mildew races Pfs: 1, Pfs: 2, Pfs: 5, Pfs: 6, Pfs: 7, Pfs: 9, Pfs: 11, Pfs: 13, Pfs: 15 and Pfs: 17. The allele also shows a dominant inheritance for the resistance it confers to downy mildew races Pfs: 8, Pfs: 12 and Pfs: 14. Furthermore the allele shows a recessive inheritance for the resistance it confers to downy mildew race Pfs: 4.

PCR conditions for amplifying the LRR domain-encoding region of an alpha-WOLF gene using primers having SEQ ID NO: 4 and SEQ ID NO: 5 are, using Platinum Taq enzyme (Thermo Fisher Scientific): 3 minutes at 95° C. (initial denaturing step); 40 amplification cycles, each cycle consisting of: 30 seconds denaturation at 95° C., 30 seconds annealing at 60° C., and 30 seconds extension at 72° C.; 2 minutes at 72° C. (final extension step).

The LRR domain of a beta-WOLF gene, e.g. the null allele as present in variety Viroflay, can be amplified using a forward primer which is a nucleic acid molecule having the sequence of SEQ ID NO: 6 and a reverse primer which is a nucleic acid molecule having the sequence of SEQ ID NO: 5.

PCR conditions for amplifying the LRR domain-encoding region of a beta-WOLF gene using primers having SEQ ID NO: 5 and SEQ ID NO: 6 are as follows, using Platinum Taq enzyme (Thermo Fisher Scientific): 3 minutes at 95° C. (initial denaturing step); 40 amplification cycles, each cycle consisting of: 30 seconds denaturation at 95° C., 50 seconds annealing at 58° C. and 50 seconds extension at 72° C.; 2 minutes at 72° C. (final extension step).

Therefore, the invention also relates to a primer pair for amplifying the LRR domain of an alpha-WOLF gene, more in particular for amplifying the LRR domain of an alpha-WOLF 24 allele wherein the forward primer is a nucleic acid molecule having the sequence of SEQ ID NO: 4 and the reverse primer which is a nucleic acid molecule having the sequence of SEQ ID NO: 5. The primers disclosed herein have been specifically designed for selectively amplifying part of a WOLF gene, and not of any other CC-NBS-LRR protein-encoding genes.

The invention relates to an alpha-WOLF 24 allele which has a coding sequence that in order of increased preference has at least 80%, 81%, 82%, 83%, 84%, 85%, 86%, 87%, 88%, 89%, 90%, 91%, 92%, 93%, 94%, 95%, 96%, 97%, 98%, 98.2%, 98.5%, 98.8%, 99%, 99.2%, 99.5%, 99.8%, 100% sequence similarity to SEQ ID NO: 11.

The invention also relates to an alpha-WOLF 24 allele which has a coding sequence that in order of increased preference has at least 80%, 81%, 82%, 83%, 84%, 85%, 86%, 87%, 88%, 89%, 90%, 91%, 92%, 93%, 94%, 95%, 96%, 97%, 98%, 98.2%, 98.5%, 98.8%, 99%, 99.2%, 99.5%, 99.8%, 100% sequence identity to SEQ ID NO: 11.

In a further aspect of the invention the alpha-WOLF 24 allele encodes for a protein having an amino acid sequence which in order of increased preference has at least 92%, 93%, 94%, 95%, 96%, 97%, 98%, 99%, 99.1%, 99.2%, 99.3%, 99.4%, 99.5%, 99.6%, 99.7%, 99.8%, 99.9%, 100% sequence similarity to SEQ ID NO: 12.

In a further aspect of the invention the alpha-WOLF 24 allele encodes for a protein having an amino acid sequence which in order of increased preference has at least 92%, 93%, 94%, 95%, 96%, 97%, 98%, 99%, 99.1%, 99.2%, 99.3%, 99.4%, 99.5%, 99.6%, 99.7%, 99.8%, 99.9%, 100% sequence identity to SEQ ID NO: 12.

The alpha-WOLF 24 allele when present in a spinach plant confers complete resistance to at least one of the 17 officially recognized *Peronospora farinosa* f. sp. *spinacea* races. In a further embodiment, the alpha-WOLF 24 allele when present in a spinach plant confers complete resistance to at least two of the 17 officially recognized *Peronospora farinosa* f. sp. *spinacea* races. In a further embodiment, the alpha-WOLF 24 allele when present in a spinach plant confers complete resistance in order of increased preference to at least three, four, five, six, seven, eight, nine, ten, eleven, twelve, thirteen, fourteen, fifteen or sixteen officially recognized *Peronospora farinosa* f. sp. *spinacea* races. The alpha-WOLF 24 allele does not confer resistance to downy mildew race Pfs: 16.

The alpha-WOLF 24 allele when heterozygously or homozygously present in a spinach plant confers complete resistance to at least the officially recognized *Peronospora farinosa* f. sp. *spinacea* races Pfs: 1, Pfs: 2, Pfs: 5, Pfs: 6, Pfs: 7, Pfs: 9, Pfs: 11, Pfs: 13, Pfs: 15 and Pfs: 17, and does not confer resistance to downy mildew race Pfs: 16 (see Table 1). The alphaWOLF24 allele when heterozygously or homozygously present in a spinach plant also confers complete resistance to at least the officially recognized *Peronospora farinosa* f. sp. *spinacea* races Pfs: 8, Pfs: 12 and Pfs: 14. Furthermore, the alphaWOLF 24 allele when homozygously present in a spinach plant confers complete resistance to *Peronospora farinosa* f. sp. *spinacea* race Pfs: 4.

The resistance of a spinach plant against one or more races of *Peronospora farinosa* f. sp. *spinaciae* can be determined using a seedling test. Herein, a seedling test is defined as a test wherein spinach plants are planted in trays containing growth medium, fertilized twice a week after seedling emergence. Plants are inoculated at the first true leaf stage with a sporangial suspension having a concentration of approximately $2.5 \times 10^5$/ml of one of the pathogenic races of *Peronospora farinosa* f. sp. *spinaciae* or isolates to be tested. Thirty plants per race are tested. The inoculated plants are placed in a dew chamber at 18° C. with 100% relative humidity for a 24 h period, and then moved to a growth chamber at 18° C. with a 12 h photoperiod for 6 days. After 6 days, the plants are returned to the dew chamber for 24 h to induce sporulation, and subsequently scored for a disease reaction.

As used herein, a plant is completely resistant against a *Peronospora farinosa* f. sp. *spinaciae* race when a plant shows no symptoms in the seedling test described herein.

As used herein, a plant is intermediately resistant against a *Peronospora farinosa* f. sp. *spinaciae* race when a plant shows only symptoms of chlorosis, or sporulation occurring only on the tips of the cotyledons in the seedling test described herein.

As used herein, a plant is susceptible to an isolate of a *Peronospora farinosa* f. sp. *spinaciae* race when a plant shows more than only symptoms of chlorosis, or when sporulation occurs on an area larger than only the tips of the cotyledons in the seedling test described herein.

Another aspect of the invention relates to a spinach plant, which may comprise the alpha-WOLF 24 allele of invention, of which a representative sample of seed was deposited with the NCIMB under accession number NCIMB 43554.

In a further embodiment the plant of the invention which may comprise the alpha-WOLF 24 allele is an agronomically elite spinach plant. In the context of this invention an agronomically elite spinach plant is a plant having a genotype that results into an accumulation of distinguishable and desirable agronomic traits which allow a producer to harvest a product of commercial significance, preferably the agronomically elite spinach plant which may comprise the alpha-WOLF 24 allele is a plant of an inbred line or a hybrid.

As used herein, a plant of an inbred line is a plant of a population of plants that is the result of three or more rounds of selfing, or backcrossing; or which plant is a double haploid. An inbred line may e.g. be a parent line used for the production of a commercial hybrid.

As used herein, a hybrid plant is a plant which is the result of a cross between two different plants having different genotypes. More in particular, a hybrid plant is the result of a cross between plants of two different inbred lines, such a hybrid plant may e.g. be a plant of an F1 hybrid variety.

A plant carrying the alpha-WOLF 24 allele in heterozygous form may further comprise a beta-WOLF 0 allele as e.g. present in variety Viroflay wherein the beta-WOLF 0 allele does not confer any resistance to downy mildew. However, a plant heterozygous for the alpha-WOLF 24 allele may further comprise an allele of the alpha/beta-WOLF gene that does provide resistance to downy mildew. Preferably, such an allele would complement the alpha-WOLF 24 allele such that the spinach plant will be at least intermediately resistant to one or more other races to which the alpha-WOLF 24 allele does not provide resistance. Most preferably the other allele of the alpha/beta-WOLF gene complements the alpha-WOLF 24 allele such that the plant is resistant to *Peronospora farinosa* f. sp. *spinaciae* races Pfs: 1 to Pfs: 17. In one embodiment such a plant is an agronomically elite plant.

Alternatively, the resistance profile of a plant carrying the alpha-WOLF 24 allele is complemented by a resistance conferring allele of a totally different gene. Examples of such genes are e.g. DMR1 as described in U.S. Pat. No. 8,354,570, DMR6 as described in U.S. Pat. No. 9,121,029 and p10 as described in US20170327839.

The invention thus relates to a spinach plant carrying the alpha-WOLF 24 allele and further may comprise a genetic determinant resulting in resistance against *Peronospora farinosa* f. sp. *spinacea* races Pfs: 1 to Pfs: 17. The genetic determinant can be another resistance conferring alpha/beta-WOLF allele or a resistance conferring allele of a totally different gene.

The invention further relates to propagation material which may comprise the alpha-WOLF 24 allele. In one embodiment, the propagation material is suitable for sexual reproduction. Such propagation material may comprise for example a microspore, pollen, ovary, ovule, embryo sac and egg cell. In another embodiment, the propagation material is suitable for vegetative reproduction. Such propagation material may comprise for example a cutting, root, stem, cell, protoplast, and a tissue culture of regenerable cells. A part of the plant that is suitable for preparing tissue cultures is in particular a leaf, pollen, an embryo, a cotyledon, a hypocotyl, a meristematic cell, a root tip, an anther, a flower, a seed and a stem.

The invention furthermore relates to a cell of a spinach plant which may comprise the alpha-WOLF 24 allele. Such a cell may be either in isolated form or may be part of the complete plant or parts thereof and then still constitutes a cell of the invention because such a cell harbors the alpha-WOLF 24 allele that confers resistance to downy mildew. Each cell of a plant of the invention carries the genetic information that confers resistance to *Peronospora farinosa* f. sp. *spinaciae*. Such a cell of the invention may also be a regenerable cell that may be used to regenerate a new plant which may comprise the allele of the invention.

Yet another aspect of the invention relates to a method for making a hybrid spinach seed which may comprise crossing a first parent spinach plant with a second parent spinach plant and harvesting the resultant hybrid spinach seed, wherein said first and/or second parent spinach plant may comprise the alpha-WOLF 24 allele. In particular embodiment, the first and/or second parent plant is a plant of an inbred line as defined herein.

The invention further relates to a hybrid spinach plant grown from seed produced by crossing a first parent spinach plant with a second parent spinach plant and harvesting the resultant hybrid spinach seed, wherein said first and/or second parent spinach plant may comprise the alpha-WOLF 24 allele.

Determining the genomic DNA or coding DNA sequence of at least part of a WOLF gene in the genome of a spinach plant may be performed using any suitable molecular biological method known in the art, including but not limited to (genomic) PCR amplification followed by Sanger sequencing, whole-genome-sequencing, transcriptome sequencing, sequence-specific target capture followed by next-generation sequencing (using, for example, the xGen® target capture system of Integrated DNA Technologies), specific amplification of LRR-domain-which may comprise gene sequences (using, for example, the RenSeq methodology, as described in U.S. patent application Ser. No. 14/627,116, and in Jupe et al., 2013, *Plant J.* 76:530-544) followed by sequencing, etcetera.

In one embodiment the invention relates to a method for identifying a plant carrying the alpha-WOLF 24 allele may comprise determining the DNA sequence coding for the LRR domain as defined herein.

In a further embodiment of the method the LRR domain of the alpha-WOLF 24 allele is determined by using a primer pair to amplify the genomic DNA region of the LRR domain. The forward primer is preferably a nucleic acid molecule having the sequence of SEQ ID NO: 4 and the reverse primer is preferably a nucleic acid molecule having the sequence of SEQ ID NO: 5.

Another aspect of the invention relates to a method for producing a spinach plant which may comprise resistance to *Peronospora farinosa* f. sp. *spinaciae* which may comprise: (a) crossing a plant which may comprise the alpha-WOLF 24 allele, with another plant; (b) optionally performing one or more rounds of selfing and/or crossing; (c) optionally selecting after each round of selfing or crossing for a plant that may comprise the alpha-WOLF 24 allele.

Selecting a plant which may comprise the alpha-WOLF 24 allele can be done genotypically by determining the presence of the genomic DNA sequence of the NBS-LRR domain of the allele having in order of increased preference 95%, 96%, 97%, 98%, 99%, 99.1%, 99.2%, 99.3%, 99.4%, 99.5%, 99.6%, 99.7%, 99.8%, 99.9%, 100% sequence similarity to SEQ ID NO: 9, or 95%, 96%, 97%, 98%, 99%, 99.1%, 99.2%, 99.3%, 99.4%, 99.5%, 99.6%, 99.7%, 99.8%, 99.9%, 100% sequence identity to SEQ ID NO: 9.

In another embodiment, selecting a plant which may comprise the alpha-WOLF 24 allele can be done genotypically by determining the presence of the coding sequence of the entire allele.

Alternatively, the presence of the alpha-WOLF 24 allele can be determined phenotypically by assaying a plant in a disease test, for example the test as described herein.

The invention further relates to the use of a spinach plant carrying the alpha-WOLF 24 allele in breeding to confer resistance against *Peronospora farinosa* f. sp. *spinaciae*.

The invention also relates to a breeding method for the development of spinach plants carrying the alpha-WOLF 24 allele of the invention wherein germplasm which may comprise said allele is used. Seed capable of growing into a plant which may comprise the allele of the invention and being representative for the germplasm was deposited with the NCIMB under accession number NCIMB 43554.

In another aspect, the invention relates to a method for the production of a spinach plant which may comprise alpha-WOLF 24 allele, which method may comprise: (a) crossing a plant which may comprise the allele with another plant; (b) optionally selecting for plants which may comprise said allele in the F1; (c) optionally backcrossing the resulting F1 with the preferred parent and selecting for plants that have the said allele in the BC1F1; (d) optionally performing one or more additional rounds of selfing, crossing, and/or backcrossing, and subsequently selecting for a plant which may comprise the said allele or shows the resistance profile corresponding to said allele. The invention also encompasses a spinach plant produced by this method.

The invention also relates to a harvested leaf of a spinach plant of the invention, to a food product which may comprise a harvested leaf of a spinach plant of the invention, either in natural or in processed form.

Spinach leaves are sold in packaged form, including without limitation as pre-packaged spinach leaves or as processed in a salad which may comprise said leaves. Mention of such a package is e.g. made in U.S. Pat. No. 5,523,136, which provides packaging film, and packages from such packaging film, including such packaging containing leafy produce, and methods for making and using such packaging film and packages, which are suitable for use with the spinach leaves of the invention. Thus, the invention comprehends the use of and methods for making and using the leaves of the spinach plant of the invention, as well as leaves of spinach plants derived from the invention.

The invention further relates to a container which may comprise one or more plants of the invention, or one or more spinach plants derived from a plant of the invention, in a growth substrate for harvest of leaves from the plant, in a domestic environment. This way the consumer may pick very fresh leaves for use in salads, when the plant is in a ready-to-harvest condition.

The invention also relates to the use of a spinach plant, of which representative seed was deposited with the NCIMB under accession number NCIMB 43554, in the production of a spinach plant which may comprise the alpha-WOLF 24 allele.

In a further embodiment the said spinach plant is a hybrid, doubled haploid, or inbred spinach plant.

Another aspect of the invention is the use of a cell which may comprise the alpha-WOLF 24 allele for the production of a spinach plant showing resistance to *Peronospora farinosa* f. sp. *spinaciae*.

The invention also relates to the use of a tissue culture which may comprise the alpha-WOLF 24 allele for the production of a spinach plant showing resistance to *Peronospora farinosa* f. sp. *spinaciae*.

In one embodiment, the invention relates to an allele designated alphaWOLF24 which when present in a spinach plant heterozygously or homozygously confers complete resistance to at least *Peronospora farinosa* f. sp. *spinacea* race Pfs: 1, Pfs: 2, Pfs: 5, Pfs: 6, Pfs: 7, Pfs: 9, Pfs: 11, Pfs: 13, Pfs: 15 and Pfs: 17, and does not confer resistance to downy mildew race Pfs: 16, wherein the protein encoded by said allele is a CC-NBS-LRR protein that may comprise in its amino acid sequence: a) the motif "MAEIGYSVC" (SEQ ID NO: 1) at its N-terminus; and b) the motif "KWMCLR" (SEQ ID NO: 2); and wherein the LRR domain of the protein has in order of increased preference at least 98.1%, 98.2%, 98.3%, 98.4%, 98.5%, 98.6%, 98.7%, 98.8%, 98.9%, 99%, 99.1%, 99.2%, 99.3%, 99.4%, 99.5%, 99.6%, 99.7%, 99.8%, 99.9%, 100% sequence identity to SEQ ID NO: 10.

In another embodiment, the invention relates to an allele designated alphaWOLF24 which when present in a spinach plant heterozygously or homozygously confers complete resistance to at least *Peronospora farinosa* f. sp. *spinacea* race Pfs: 1, Pfs: 2, Pfs: 5, Pfs: 6, Pfs: 7, Pfs: 9, Pfs: 11, Pfs: 13, Pfs: 15 and Pfs: 17, and does not confer resistance to downy mildew race Pfs: 16, wherein the protein encoded by said allele is a CC-NBS-LRR protein that may comprise in its amino acid sequence: a) the motif "MAEIGYSVC" (SEQ ID NO: 1) at its N-terminus; and b) the motif "KWMCLR" (SEQ ID NO: 2); and wherein the LRR domain of the protein has in order of increased preference at least 98.1%, 98.2%, 98.3%, 98.4%, 98.5%, 98.6%, 98.7%, 98.8%, 98.9%, 99%, 99.1%, 99.2%, 99.3%, 99.4%, 99.5%, 99.6%, 99.7%, 99.8%, 99.9%, 100% sequence identity to SEQ ID NO: 10, and wherein the genomic DNA sequence of the LRR domain in order of increased preference has at least 99%, 99.1%, 99.2%, 99.3%, 99.4%, 99.5%, 99.6%, 99.7%, 99.8%, 99.9%, 100% sequence identity to SEQ ID NO: 9.

In a further embodiment, the invention relates to a spinach plant which may comprise an allele designated alphaWOLF24 which when present in a spinach plant heterozygously or homozygously confers complete resistance to at least *Peronospora farinosa* f. sp. *spinacea* race Pfs: 1, Pfs: 2, Pfs: 5, Pfs: 6, Pfs: 7, Pfs: 9, Pfs: 11, Pfs: 13, Pfs: 15 and Pfs: 17, and does not confer resistance to downy mildew race Pfs: 16, wherein the protein encoded by said allele is a CC-NBS-LRR protein that may comprise in its amino acid sequence: a) the motif "MAEIGYSVC" (SEQ ID NO: 1) at its N-terminus; and b) the motif "KWMCLR" (SEQ ID NO: 2); and wherein the LRR domain of the protein has in order of increased preference at least 98.1%, 98.2%, 98.3%, 98.4%, 98.5%, 98.6%, 98.7%, 98.8%, 98.9%, 99%, 99.1%, 99.2%, 99.3%, 99.4%, 99.5%, 99.6%, 99.7%, 99.8%, 99.9%, 100% sequence identity to SEQ ID NO: 10. Preferably this spinach plant is an agronomically elite spinach plant.

In a further embodiment, the invention relates to a spinach plant which may comprise an allele designated alphaWOLF 24 which when present in a spinach plant heterozygously or homozygously confers complete resistance to at least *Peronospora farinosa* f. sp. *spinacea* race Pfs: 1, Pfs: 2, Pfs: 5, Pfs: 6, Pfs: 7, Pfs: 9, Pfs: 11, Pfs: 13, Pfs: 15 and Pfs: 17, and does not confer resistance to downy mildew race Pfs: 16, wherein the protein encoded by said allele is a CC-NBS-LRR protein that may comprise in its amino acid sequence: a) the motif "MAEIGYSVC" (SEQ ID NO: 1) at its N-terminus; and b) the motif "KWMCLR" (SEQ ID NO: 2); and wherein the LRR domain of the protein has in order of increased preference at least 98.1%, 98.2%, 98.3%, 98.4%, 98.5%, 98.6%, 98.7%, 98.8%, 98.9%, 99%, 99.1%, 99.2%, 99.3%, 99.4%, 99.5%, 99.6%, 99.7%, 99.8%, 99.9%, 100% sequence identity to SEQ ID NO: 10, and wherein the genomic DNA sequence of the LRR domain in order of increased preference has at least 99%, 99.1%, 99.2%, 99.3%, 99.4%, 99.5%, 99.6%, 99.7%, 99.8%, 99.9%, 100% sequence identity to SEQ ID NO: 9. Preferably this spinach plant is an agronomically elite spinach plant.

In one embodiment, the invention relates to an agronomically elite hybrid spinach plant which may comprise the alphaWOLF24 allele of the invention as described in this application and another downy mildew resistance conferring allele of alpha/beta-WOLF gene, wherein the other downy mildew resistance conferring allele of the alpha/beta-WOLF gene is beta-WOLF 3 having a genomic sequence which in order of increased preference has at least 95%, 96%, 97%, 98%, 99%, 100% sequence similarity to SEQ ID No: 13, and wherein the plant is resistant to at least *Peronospora farinosa* f. sp. *spinaciae* races Pfs: 1, Pfs: 2, Pfs: 5, Pfs: 6, Pfs: 7, Pfs: 9, Pfs: 11, Pfs: 13, Pfs: 15, Pfs: 16 and Pfs: 17.

Table 1: Resistance profile conferred by the alpha-WOLF 24 allele. A "-" means complete resistance against a particular downy mildew race; "(-)" means intermediate resistance against a particular downy mildew race; "-*" means that when the allele is present homozygously it confers complete resistance against a particular downy mildew race, while the allele does not confer resistance to that downy mildew race when present heterozygously; "+" means that the allele confers no resistance and would cause a plant only carrying the alpha-WOLF 24 allele to be fully susceptible for that particular downy mildew race; "nt" means that it has not been tested against that isolate.

| alpha-WOLF 24 resistance profile | |
|---|---|
| *Peronospora farinosa* f. sp. *spinaciae* race | Resistance score |
| Pfs: 1 | - |
| Pfs: 2 | - |
| Pfs: 3 | nt |
| Pfs: 4 | -* |
| Pfs: 5 | - |
| Pfs: 6 | - |
| Pfs: 7 | - |
| Pfs: 8 | - |
| Pfs: 9 | - |
| Pfs: 10 | nt |
| Pfs: 11 | - |
| Pfs: 12 | - |
| Pfs: 13 | - |
| Pfs: 14 | - |
| Pfs: 15 | - |
| Pfs: 16 | + |
| Pfs: 17 | - |

Table 2. Sequence information.

TABLE 2

| Sequence information | |
|---|---|
| SEQ ID NO: 1: | MAEIGYSVC |
| SEQ ID NO: 2: | KWMCLR |
| SEQ ID NO: 3: | HVGCVVDR |
| SEQ ID NO: 4:<br>Forward primer<br>LRR domain<br>(Alpha) | ACAAGTGGATGTGTCTTAGG |
| SEQ ID NO: 5:<br>Reverse primer<br>LRR domain<br>(Alpha) | TTCGCCCTCATCTTCCTGG |
| SEQ ID NO: 6:<br>Forward primer<br>LRR domain<br>(Beta) | TCACGTGGGTTGTGTTGT |
| SEQ ID NO: 7:<br>Amplicon of<br>LRR domain of<br>the beta-WOLF<br>allele | TCACGTGGGTTGTGTTGTCGATAGAGATCCAGAAATAGTCTTTTTA<br>TGTAGCAATAAGATTCGTTCGTATATTAGCGGTCGCTGCATAAAG<br>AATCCGGTGGATTCACAAATAGACAACTGGATGTGCCTTAGGGTG<br>TTGGACTTGTCAGATTCATGTGTTAAAGATTTGTCTGATTCAATAG<br>GTAAGCTGCTGCACTTAAGGTATCTTAACCTCTCTTCTAATATAAA<br>GTTGGAGATAATCCCTGATGCAATTACAAGACTGCATAACTTGCA<br>GACACTACTTTTAGAAGATTGCAGAAGTTTAAAGGAGTTGCCAAA<br>AGATTTTTGCAAATTGGTCAAACTGAGGCACTTGGAATTACAGGG<br>TTGTCATGATTTGATTGGTATGTCATTTGGAATGGATAAGCTAACT<br>AGTCTTAGAATACTACCAAACATTGTGGTGGGTAGGAAGGAACAA<br>AGTGTTGATGATGAGCTGAAAGCCCTAAAAGGCCTCACCGAGATA<br>AAAGGCTCCATTGATATCACAATCTATTCAAAATATAGAAGAGTT<br>GAAGGCATGAATGGCACAGGAGGAGGAGCTGGGTATTTGAAGAG<br>CATGAAACATCTCACGGGGGTTAATATTACATTTGATGAAGGTGG<br>ATGTGTTAACCCTGAAGCTGTGTATTTGAAGAGCATGAAACATCTC<br>ACGAGGGTTATTATTATATTTGATTATAAAGGTGGATGTGTTAACC<br>CTGAAGCTGTGTTGGCAACCCTAGAGCCACCTTCAAATATCAAGA<br>GGTTAGAGATGTGGCATTACAGTGGTACAACAATTCCAGTATGGG<br>GAAGAGCAGAGATTAATTGGGCAATCTCCCTCTCACATCTTGTCG<br>ACATCACGCTTGAAGATTGTTACAATTTGCAGGAGATGCCAGTGC<br>TGAGTAAACTGCCTCATTTGAAATCACTGGAACTTACAGAGTTGG<br>ATAACTTAGAGTACATGGAGAGTAGAAGCAGCAGCAGTAGCAGT<br>GACACAGAAGCAGCAACACCAGAATTACCAACATTCTTCCCTTCC |

TABLE 2-continued

Sequence information

| | |
|---|---|
| | CTTGAAAAACTTACACTTTGGCGTCTGGACAAGTTGAAGGGTTTTG<br>GGAACAGGAGATCGAGTAGTTTTCCCCGCCTCTCTAAATTGGAAA<br>TCTGGAAATGTCCAGATCTAACGTCATTTCCTTCTTGTCCAAGCCT<br>TGAAGAGTTGGAATTGAAAGAAAACAATGAAGCGTTGCAAATAAT<br>AGTAAAAATAACAACAACAAGAGGTAAAGAAGAAAAAGAAGAA<br>GACAAGAATGCTGGTGTTGGAAATTCACAAGATGATGACAATGTC<br>AAATTATGGAAGGTGGAAATAGACAATCTGGGTTATCTCAAATCA<br>CTGCCCACAAATTGTCTGACTCACCTCGACCTTACAATAAGTGATT<br>CCAAGGAGGGGAGGGTGAATGGGAAGTTGGGGATGCATTTCAG<br>AAGTGTGTATCTTCTTTGAGAAGCCTCACCATAATCGGAAATCACG<br>GAATAAATAAAGTGAAGAGACTGTCTGGAAGAACAGGGTTGGAG<br>CATTTCACTCTGTTGGAATCACTCAAACTTTCAGATATAGAAGACC<br>AGGAAGATGAGGGCGAA |
| SEQ ID NO: 8:<br>Amino acid<br>sequence<br>encoded by<br>amplicon of LRR<br>domain Beta<br>Wolf 0 (Viroflay) | HVGCVVDRDPEIVFLCSNKIRSYISGRCIKNPVDSQIDNWMCLRVLDL<br>SDSCVKDLSDSIGKLLHLRYLNLSSNIKLEIIPDAITRLHNLQTLLLEDC<br>RSLKELPKDFCKLVKLRHLELQGCHDLIGMSFGMDKLTSLRILPNIVV<br>GRKEQSVDDELKALKGLTEIKGSIDITIYSKYRRVEGMNGTGGGAGY<br>LKSMKHLTGVNITFDEGGCVNPEAVYLKSMKHLTRVIIIFDYKGGCV<br>NPEAVLATLEPPSNIKRLEMWHYSGTTIPVWGRAEINWAISLSHLVDI<br>TLEDCYNLQEMPVLSKLPHLKSLELTELDNLEYMESRSSSSSSDTEAA<br>TPELPTFFPSLEKLTLWRLDKLKGFGNRRSSSFPRLSKLEIWKCPDLTS<br>FPSCPSLEELELKENNEALQIIVKITTTRGKEEKEEDKNAGVGNSQDD<br>DNVKLWKVEIDNLGYLKSLPTNCLTHLDLTISDSKEGEGEWEVGDAF<br>QKCVSSLRSLTIIGNHGINKVKRLSGRTGLEHFTLLESLKLSDIEDQED<br>EGE |
| SEQ ID NO: 9:<br>Amplicon of<br>LRR domain of<br>the alpha-WOLF<br>24 allele | ACAAGTGGATGTGTCTTAGGATGTTGGACTTGTCAAGGTCGGATG<br>TTAAAAATTTGCCTAATTCAATAGGTAAATTGTTGCACTTGAGGTA<br>TCTTAACCTGTCAGATAATAGAAATCTAAAGATACTTCCTGATGCA<br>ATTACAAGACTGCATAATTTGCAGACACTTCTTTTAGTAGATTGCA<br>GAAGTTTAAAGGAGTTGCCAAAAGATTTTTGCAAATTGGTCAAAC<br>TGAGGCACTTGGAATTACAGGGTTGTCATGATTTGATTGGTATGCC<br>ATTTGGAATGGATAAGCTAACTAGTCTTAGAGTACTACCAAAAGT<br>TGTGGTGGGTAAGAAGGAACAAAGTGATGATCAGCTGAAAGCCCT<br>AAAAGGCCTCACCGAGATAAAAGGCTCCATTGATATCACAATCTA<br>TTCAAAGTATAGAATAGTTGAAGGCATGAATGACACAGGAGGAGC<br>TGGGTATTTGAAGAGCATGAAACATCTCACGGGGGTTGATATTAC<br>ATTTTTGGGTGAATGTGTTAACCCTGAAGCTGTGTTGGCAACCCTA<br>GAGCCACCTTCAAATATCAAGAGCTTATCTATACATCGTTTTGATG<br>GTAAAACACTTCCAGTATGGGGAAGAGCAGAGATTAATTGGGCAA<br>TCTCCCTCTCACATCTTGTCGACATCAAGCTTAGTTGTTGTCGTAAT<br>TTGCAGGAGATGCCAGTGCTGAGTAAACTGCCTCATTTGAAATCA<br>CTGGAACTTCGATGTTTGGAAAACTTAGAGTACATGGAGAGTAGA<br>AGCAGCAGCAGTAGCAGTGACAAAGAAGCAGCAACACCAGAATT<br>ACCAACATTCTTCCCTTCCCTTGAAAAACTTACACTTTGGTATCTG<br>GAAAAGTTGAAGGGTTTGGGGAACAGGAGATCGAGTAGTTTTCCC<br>CGCCTCTCTAAATTGGAAATCCGGGAATGCCCAGATCTAACGTGG<br>TTTTCCTCCTTGTCCAAGCCTTGAAACGTTGAAATTGGAAAAAACA<br>ATGAAGCGTTGCAAAAAATAACAACAACAAGAGGTAAAGAAGAA<br>AAAGAAGAAGACAAGAATGCTGGTGTTGGAAATTCACAAGATGA<br>TGACAATGTCAAATTACGGAAGGTGAAAATAGACAATCTGGGTTA<br>TCTCAAATCACTGCCCACAAATTGTCTTACTCACCTCGACCTTACA<br>ATAAGAGATTCCAAGGAGGGGAGGGTGAATGGGAAGTTGGGGA<br>TGCATTTCAGAAGTGTGTATCTTCTTTGAGAAGCCTCACCATAATC<br>GGAAATCACGGAATAAATAAAGTGAAGAGACTGTCTGGAAGAAC<br>AGGGTTGGAGCATTTCACTCTGTTGGACTCACTCAAATTTTCAAAG<br>ATAGAAGACCAGGAAGATGAGGGCGAA |
| SEQ ID NO: 10:<br>Amino acid<br>sequence<br>encoded by<br>amplicon of LRR<br>domain of alpha-<br>WOLF 24 | KWMCLRMLDLSRSDVKNLPNSIGKLLHLRYLNLSDNRNLKILPDAIT<br>RLHNLQTLLLVDCRSLKELPKDFCKLVKLRHLELQGCHDLIGMPFGM<br>DKLTSLRVLPKVVVGKKEQSDDQLKALKGLTEIKGSIDITIYSKYRIVE<br>GMNDTGGAGYLKSMKHLTGVDITFLGECVNPEAVLATLEPPSNIKSL<br>SIHRFDGKTLPVWGRAEINWAISLSHLVDIKLSCCRNLQEMPVLSKLP<br>HLKSLELRCLENLEYMESRSSSSSSDKEAATPELPTFFPSLEKLTLWYL<br>EKLKGLGNRRSSSFPRLSKLEIRECPDLTWFPPCPSLETLKLEKNNEAL<br>QKITTTRGKEEKEEDKNAGVGNSQDDDNVKLRKVKIDNLGYLKSLPT<br>NCLTHLDLTIRDSKEGEGEWEVGDAFQKCVSSLRSLTIIGNHGINKVK<br>RLSGRTGLEHFTLLDSLKFSKIEDQEDEGE |
| SEQ ID NO: 11<br>Coding sequence<br>of the alpha-<br>WOLF 24 allele | ATGGCCGAAATCGGATACTCGGTTTGTGCGAAACTCATCGA<br>AGTGATTGGCAGTGAGCTGATCAAAGAGATTTGTGACACAT<br>GGGGTTACAAATCTCTTCTTGAGGACCTCAACAAAACTGTAT<br>TGACGGTCAGGAACGTTCTCATTCAAGCCGGGGTGATGCGG<br>GAGCTTACTAGTGAACAACAAGGTTTCATTGCAGACCTTAA<br>AGATGTTGTTTATGATGCTGATGACTTGTTCGACAAGTTACT<br>CACTCGTGCTGAGCGAAAACAGATTGATGGAAACGAAATCT<br>CTGAAAAGGTACGTCGTTTCTTTTCCTCAGTAACAAGATCG |

TABLE 2-continued

| Sequence information |
|---|
| GTCAAGCTTACTACATGTCTCGTAAGGTTAAGGAAATTAAG |
| AAGCAGTTGGATGAAATTGTTGATAGGCATACAAAATTTGG |
| GTTTAGTGCTGAGTTTATACCTGTTTGTAGGGGAAGGGGAAA |
| CGAGAGGGAAACACGTTCATATATAGATGTCAAGAATATTC |
| TTGGGAGGGATAAAGATAAGAATGATATCATAGATAGGTTG |
| CTTAATCGTAATGGTAATGAAGCTTGTAGTTTCCTGACCATA |
| GTGGGAGCGGGAGGATTGGGAAAAACTGCTCTTGCACAACT |
| TGTGTTCAATGATGAAAGGGTCAAAATTGAGTTCCATGATTT |
| GAGGTATTGGGTTTGTGTCTCTGATCAAGATGGGGCCAATT |
| TGATGTGAAAGAAATCCTTTGTAAGATTTTAGAGGTGGTTAC |
| TAAGGAGAAAGTTGATAATAGTTCCACATTGGAATTGGTAC |
| AAAGCCAATTTCAAGAGAAGTTAAGAGGAAAGAAGTACTTC |
| CTTGTTCTTGATGATGTATGGAACGAGGATCGTGAGAAGTG |
| GCTTCCTTTGGAAGAGTTGTTAATGTTGGGTCAAGGGGGAA |
| GCAAGGTTGTAGTGACCACACGTTCAGAGAAGACAGCAAAT |
| GTCATAGGGAAAAGACATTTTTATACACTGGAATGTTTGTCA |
| CCAGATTATTCATGGAGCTTATTTGAAATGTCGGCTTTTCAG |
| AAAGGGCATGAGCAGGAAAACCATCACGAACTAGTTGATAT |
| TGGGAAAAAGATTGTTGAAAAATGTTATAACAATCCACTTG |
| CTATAACGGTGGTAGGAAGTCTTCTTTATGGAGAGGAGATA |
| AGTAAGTGGCGGTCATTTGAAATGAGTGAGTTGGCCAAAAT |
| TGGCAATGGGGATAATAAGATTTTGCCGATATTAAAGCTCA |
| GTTACCATAATCTTATACCCTCGTTGAAGAGTTGTTTTAGTT |
| ATTGTGCAGTGTTTCCCAAGGATCATGAAATAAAGAAGGAG |
| ATGTTGATTGAACTTTGGATGGCACAAGGATATGTTGTGCCG |
| TTGGATGGAGGTCAAAGTATAGAAGATGCTGCCGAGGAACA |
| TTTTGTAATTTTGTTACGAAGGTGTTTCTTTCAAGATGTAAA |
| GAAGGATAAATATGGTGATGTTGATTCTGTTAAAATCCACG |
| ACTTGATGCACGATGTCGCCCAAGAAGTGGGGAGGGAGGAA |
| TTATGTGTAGTGAATGATAATACAAAGAACTTGGGTGATAA |
| AATCCGTCATGTACATCGTGATGTCATTAGATATGCACAAAG |
| AGTCTCTCTGTGTAGCCATAGCCATAAGATTCGTTCGTATAT |
| TGGTGGTAATTGTGAAAAACGTTGTGTGGATACACTAATAG |
| ACAAGTGGATGTGTCTTAGGATGTTGGACTTGTCAAGGTCGG |
| ATGTTAAAAATTTGCCTAATTCAATAGGTAAATTGTTGCACT |
| TGAGGTATCTTAACCTGTCAGATAATAGAAATCTAAAGATA |
| CTTCCTGATGCAATTACAAGACTGCATAATTTGCAGACACTT |
| CTTTTAGTAGATTGCAGAAGTTTAAAGGAGTTGCCAAAAGA |
| TTTTTGCAAATTGGTCAAACTGAGGCACTTGGAATTACAGGG |
| TTGTCATGATTTGATTGGTATGCCATTTGGAATGGATAAGCT |
| AACTAGTCTTAGAGTACTACCAAAAGTTGTGGTGGGTAAGA |
| AGGAACAAAGTGATGATCAGCTGAAAGCCCTAAAAGGCCTC |
| ACCGAGATAAAAGGCTCCATTGATATCACAATCTATTCAAA |
| GTATAGAATAGTTGAAGGCATGAATGACACAGGAGGAGCTG |
| GGTATTTGAAGAGCATGAAACATCTCACGGGGGTTGATATT |
| ACATTTTTGGGTGAATGTGTTAACCCTGAAGCTGTGTTGGCA |
| ACCCTAGAGCCACCTTCAAATATCAAGAGCTTATCTATACAT |
| CGTTTTGATGGTAAAACACTTCCAGTATGGGGAAGAGCAGA |
| GATTAATTGGGCAATCTCCCTCTCACATCTTGTCGACATCAA |
| GCTTAGTTGTTGTCGTAATTTGCAGGAGATGCCAGTGCTGAG |
| TAAACTGCCTCATTTGAAATCACTGGAACTTCGATGTTTGGA |
| AAACTTAGAGTACATGGAGAGTAGAAGCAGCAGCAGTAGCA |
| GTGACAAAGAAGCAGCAACACCAGAATTACCAACATTCTTC |
| CCTTCCCTTGAAAAACTTACACTTTGGTATCTGGAAAAGTTG |
| AAGGGTTTGGGGAACAGGAGATCGAGTAGTTTTCCCCGCCT |
| CTCTAAATTGGAAATCCGGGAATGCCCAGATCTAACGTGGTT |
| TCCTCCTTGTCCAAGCCTTGAAACGTTGAAATTGGAAAAAAA |
| CAATGAAGCGTTGCAAAAAATAACAACAACAAGAGGTAAA |
| GAAGAAAAGAAGAAGACAAGAATGCTGGTGTTGGAAATT |
| CACAAGATGATGACAATGTCAAATTACGGAAGGTGAAAATA |
| GACAATCTGGGTTATCTCAAATCACTGCCCACAAATTGTCTT |
| ACTCACCTCGACCTTACAATAAGAGATTCCAAGGAGGGGGA |
| GGGTGAATGGGAAGTTGGGGATGCATTTCAGAAGTGTGTAT |
| CTTCTTTGAGAAGCCTCACCATAATCGGAAATCACGGAATA |
| AATAAAGTGAAGAGACTGTCTGGAAGAACAGGGTTGGAGCA |
| TTTCACTCTGTTGGACTCACTCAAATTTTCAAAGATAGAAGA |
| CCAGGAAGATGAGGGCGAAGACAACATCATGTTCTGGAAAA |
| CCTTTCCTCAAAACCTCCGCAGTTTGAGAATTAAAGACTCTG |
| ACAAAATGACAAGTTTGCCCATGGGATGCAGTACTTAACC |
| TCCCTCCAAACCCTCTATCTACACCATTGTTATGAATTGAAT |
| TCCCTTCCAGAATGGATAAGCAGCTTATCATCTCTTCAATCC |
| CTGTACATATACAAATGTCCAGCCCTAAAATCACTACCAGA |
| AGCAATGCGGAACCTCACCTCCCTTCAGAGCCTTGTGATACG |
| GCGGTGTCCAGACCTAATTGAAAGATGCGAAGAACCCAACG |
| GCGAGGACTATCCCAAAATTCGACACATCTCCAGAATTGTA |
| CTAAATGAATATTGGTGA |

TABLE 2-continued

Sequence information

| | |
|---|---|
| SEQ ID NO: 12:<br>Amino acid<br>sequence of the<br>alpha-WOLF 24<br>allele | MAEIGYSVCAKLIEVIGSELIKEICDTWGYKSLLEDLNKTVLTV<br>RNVLIQAGVMRELTSEQQGFIADLKDVVYDADDLFDKLLTRAE<br>RKQIDGNEISEKVRRFFSSSNKIGQAYYMSRKVKEIKKQLDEIV<br>DRHTKFGFSAEFIPVCRGRGNERETRSYIDVKNILGRDKDKNDII<br>DRLLNRNGNEACSFLTIVGAGGLGKTALAQLVENDERVKIEFH<br>DLRYWVCVSDQDGGQFDVKEILCKILEVVTKEKVDNSSTLELV<br>QSQFQEKLRGKKYFLVLDDVWNEDREKWLPLEELLMLGQGGS<br>KVVVTTRSEKTANVIGKRHFYTLECLSPDYSWSLFEMSAFQKG<br>HEQENHHELVDIGKKIVEKCYNNPLAITVVGSLLYGEEISKWRS<br>FEMSELAKIGNGDNKILPILKLSYHNLIPSLKSCFSYCAVFPKDH<br>EIKKEMLIELWMAQGYVVPLDGGQSIEDAAEEHFVILLRRCFFQ<br>DVKKDKYGDVDSVKIHDLMHDVAQEVGREELCVVNDNTKNL<br>GDKIRHVHRDVIRYAQRVSLCSHSHKIRSYIGGNCEKRCVDTLI<br>DKWMCLRMLDLSRSDVKNLPNSIGKLLHLRYLNLSDNRNLKIL<br>PDAITRLHNLQTLLLVDCRSLKELPKDFCKLVKLRHLELQGCH<br>DLIGMPFGMDKLTSLRVLPKVVVGKKEQSDDQLKALKGLTEIK<br>GSIDITIYSKYRIVEGMNDTGGAGYLKSMKHLTGVDITFLGECV<br>NPEAVLATLEPPSNIKSLSIHRFDGKTLPVWGRAEINWAISLSHL<br>VDIKLSCCRNLQEMPVLSKLPHLKSLELRCLENLEYMESRSSSS<br>SSDKEAATPELPTFFPSLEKLTLWYLEKLKGLGNRRSSSFPRLSK<br>LEIRECPDLTWFPPCPSLETLKLEKNNEALQKITTTRGKEEKEED<br>KNAGVGNSQDDDNVKLRKVKIDNLGYLKSLPTNCLTHLDLTIR<br>DSKEGEGEWEVGDAFQKCVSSLRSLTIIGNHGINKVKRLSGRTG<br>LEHFTLLDSLKFSKIEDQEDEGEDNIMFWKTFPQNLRSLRIKDS<br>DKMTSLPMGMQYLTSLQTLYLHHCYELNSLPEWISSLSSLQSL<br>YIYKCPALKSLPEAMRNLTSLQSLVIRRCPDLIERCEEPNGEDYP<br>KIRHISRIVLNEYW |
| SEQ ID NO: 13:<br>Genomic DNA<br>sequence of the<br>full-length beta-<br>WOLF 3 allele. | ATGGCTGAAATCGGATACTCGGTTTGTTCAAAACTTATTGAA<br>GTGATGGGCAGTAAGATCATTAAAGAGATTTGTGACATGTG<br>GGGTTACAAATCTCATCTTGAAGACCTCAACAAATCTGTCTT<br>GACGATCAAGGATGTGCTCTTGGATGCTGAGGCGAAGCGGG<br>ATCTTTCCCGTGAACAACAGAGTTACATTGCAGAACTTAAGG<br>ATGTTGTTTACGATGCTGATGATTTGTTCGATGAGTTCCTCA<br>CTCTTGCTGAGCTCAAACAGATTGATGGCAACAACAAGGGT<br>GGTGGTAAATTCTCCAAAAAGGTACGTCGTTTCTTTTCTTCT<br>AATAAGGAGAAGATGGGTCAAGCTTACAAGATGTCTCATAT<br>GGTTAAAGAAATTAAGAAGCAGTTGGGTGAAATTGTTGATA<br>GGTATACCAAATTTGGGTTTATTGTTGATTATAAACCTATTA<br>TTAGGAGAAGGGAGGAAACATGTTCTTATTTTGTAGGTGCC<br>AAGGAGATTGTTGGGAGGGATAAGGATAAAGATGTTATCAT<br>AGGCATGTTGCTAGATCATGATAACGATTGTAGTTTCTTGGC<br>TGTTGTGGGGGTTGGAGGGGTGGGAAAAACTACTCTTGCCC<br>AACTTGTGTATAATGATGAAAGAGTCAAAAGTGAGTTCCAA<br>GATTTGAGGTATTGGGTTTGTGTCTCTGATCAAGATGGGGGA<br>CAATTTGATGACAAAAGAATTCTTTGTAAGATTATAGAGTTA<br>GTTACGGGCCAGATTCCTCCGAGTAACGAGAGCATGGAATC<br>GGTGCGTAAGAAATTTCAAGAGGAATTAGGAGGAAAGAAGT<br>ACTTCCTTGTTCTTGATGATGTATGGAACGAGGATCGCCAGA<br>AGTGGCTTCATCTAGAAAATTTCTTGAAATTGGGTCAAGGGG<br>GAAGCAAGATTGTGGTAACCACACGTTCAGAGAAGACGGCA<br>AATGTTATAGGGAAAAGACAAGACTATAAACTAGAATGTTT<br>GTCAGCAGAGGATTCATGGCGCTTATTTGAAATGTCAGCTTT<br>TGACGAAGGGCATGGCCAGGAAAACTATGACGAATTAGTGA<br>CGATTGGCAAGAAGATTGTTGAAAAATGTTATAACAATCCA<br>CTTGCTATAACAGTGGTAGGAAGCCTTCTTTTTGGACAAGAG<br>ATAAATAAGTGGCGGTCGTTTGAAAGCAGTGGATTAGCCCA<br>AATTGCCAATGGTGATAATCAGATTTTCCCGATATTAAAGCT<br>CAGTTACCACAATCTTCCACACTCCTTGAAGAGCTGCTTTAG<br>CTATTGTGCAGTGTTTCCCAAAGATTATGAAATAAAGAAGG<br>AGATGTTGATTGATCTTTGGATAGCACAAGGATACATTATAC<br>CGTTGGATGGAGGTCAAAGTATAGAAGATGCTGCCGAGGAA<br>CATTTTGTAATTTTGTTAAGAAGATGTTTCTTTCAAGATGTA<br>AAGAAGGATTCTCTTGGTAATGTTGATTATGTTAAAATCCAC<br>GACTTAATGCACGATGTCGCTCAAGAAGTGGGGAAGGAGGA<br>AATCTGTGTAGTGACTTCAGGTACAAAGAAGTTGGCTGATAA<br>AAATCCGTCACGTGGGTTGTGTTGTCGATAGAGATCCAGAA<br>ATAGTCTTTTTATGTAGCAATAAGATTCGTTCGTATATTAGC<br>GGTCGTTGTATAAAGAATCCGGTGGATTCACAAATAGACAA<br>CTGGATGCGCCTTAGGGTGTTGGACTTGTCAGATTCATGTGT<br>TAAAGATTTGTCTGATTCAATAGGTAAGCTGCTGCACTTAAG<br>GTATCTTAACCTCTCTTCTAATATAAAGTTGGAGATAATCCC<br>TGATGCAATTACAAGACTGCATAACTTGCAGACACTACTTTT<br>AGAATATTGCAGAAGTTTAAAGGAGTTGCCAAAAGATTTTT<br>GCAAATTGGTCAAACTGAGACACTTGGATTTAAGGGGTTGT<br>CAGTGTTTGATTGGTATGCCATTGGGAATGGATAGGCTAATT<br>AGTCTTAGAGTACTACCAAAAGTTGTGGTGGGTAAGAAGGA |

TABLE 2-continued

| Sequence information |
|---|
| ACAAAGTGATGATCAGCTGAAAGCCCTAAAAGGCCTCACCG |
| AGATAAAAGGCTCCATTGATATCACAATCTATTCAAAGTATA |
| GAATAGTTGAAGGCATGAATGACACAGGAGGAGCTGGGTAT |
| TTGAAGAGCATGAAACATCTCACGGGGGTTGATATTAGATTT |
| GATGATAGAGAAGGTGGATGTGTTAACCCTGAAGCTGTGTT |
| GGCAACCCTAGAGCCACCTTCAAATATCAAGAGGTTAGAGA |
| TGTGGCATTACAGTGGTACAACAATTCCAGTATGGGGAAGA |
| GCAGAGATTAATTGGGCAATCTCCCTCTCACATCTTGTCGAC |
| ATCCAGCTTAGTTTTTGTAGAAATTTGCAGGAGATGCCAGTG |
| CTGAGTAAACTGCCTCATTTGAAATCACTGGAACTTACAGAG |
| TTGGATAACTTAGAGTACATGGAGAGTAGAAGCAGCAGCAG |
| TAGCAGTGACACAGAAGCAGCAACACCAGAATTACCAACAT |
| TCTTCCCTTCCCTTGAAAAACTTTCACTTTGGGGTCTGGAAA |
| AGTTGAAGGGTTTGGGGAACAGGAGATCGAGTAGTTTTCCC |
| CGCCTCTCTAAATTGGAAATCTGGGAATGCCCAGATCTAACG |
| TCATTTCCTTCTTGTCCAAGCCTTGAAAAGTTGGAATTGAAA |
| GAAAACAATGAAGCGTTGCAAATAATAGTAAAAATAACAAC |
| AACAAGAGGTAAAGAAGAAAAAGAAGAAGACAAGAATGCT |
| GGTGTTGGAAATTCACAAGATGATGACAATGTCAAATTATG |
| GAAGGTGGAAATAGACAATCTGGGTTATCTCAAATCACTGC |
| CCACAAATTGTCTTACTCACCTCGACCTTACAATAAGAGATT |
| CCAAGGAGGGGAGGGTGAATGGGAAGTTGGGGAGGCATT |
| TCAGAAGTGTGTATCTTCTTTGAGAAAGCTCAGCATAATCGG |
| AAATCACGGAATAAATAAAGTGAAGAGACTGTCTGGAAGAA |
| CAGGGTTGGAGCATTTCACTCTGTTGGACTCACTCGAACTTT |
| CAAATATAGAAGACCAGGAAGATGAGGGCGAAGACAACAT |
| CATGTTCTGGAAATCCTTTCCTCAAAACCTCCGCAATTTGGA |
| AATTAATTACTCTGACAAAATGACAAGTTTTCCCATGGGGAT |
| GCAGTACTTAACCTCCCTCCAAACCATCCATCTTTATGATTG |
| TTATAAATTGAATTCCATTCCAGAATGGATAAGCAGCTTATC |
| ATCTCTTCAATCCCTGCACATAGGAAAATGTCCAGCCCTAAA |
| ATCACTACCAGAAGCAATGCGGAACCTCACCTCCCTTCAGA |
| GACTTACGATATGGCAGTGTCCAGACCTAATTGAAAGATGC |
| AAAGAACCTAACGGGGAGGACTATCCCAAAATTGTAAGTCA |
| TTGCAGAAAGTAATTTATTCATTTATATTTATTTTATGCTTAG |
| AATGATATACGCAGTCGTCCTTTGGTTTCAAATCTTGAATTT |
| GGTTTTTGTTTTCTTTCTTTGTTTCTTTATTCAACACCAGTCCA |
| TTTATGATTGATTCATTAAAAAAAGGATGGAGTTTTATGGAT |
| TTGAAGAAGACAACGAATTGAGATTCCTGGGGTTTTTTTTTC |
| GTTGGGGTTGGTTTTCATGTATATGTTGCTGATTAAATACCA |
| GACTGATGATGATGATGTGTTTATGGGTTTTAAATCAGATTA |
| AATATATGGGAAATGTAAGTTAATTGGGGATGCACATAAGG |
| TGTTTGATGAAATGTCTATTAGAAATGTTGTTTCTTGGACTT |
| AGAATGATATACACTGTCGTCCTTTGGTTTCCAATCTGGAAT |
| TTGGTTTTTGTTTTCTTAGTTTGTTTCTTTATTCCACACTAGCC |
| CATTTTTTTTAAACTACCTGCAACTACTGAATTTCATTTACCC |
| TGTATCTCAGATTATATGGTAGTAATTCTCATTTACTCAACA |
| CTAGCTTGATCCTGAACGCAGCCAACCTTCAGGTTAGAATCC |
| GCCTTACTCATCCTTTTGTCATGAATTGTTTTAAGTTGTTTTG |
| CTTGCTTGTGTAATCATAATTCATAGTATACGATTCATCATTC |
| ACTATGTCTATAGGCAAGATATTGGAATTGTTCACGATTTCC |
| TGAAGTTTCTTTGTTTTTGTTGATACCACCATATTGCAGCTTA |
| TAGTGACTAAGTTAATGAATGTTTCCAAAAATTAGTCATATA |
| AATTCTTCTTCTCTCTATTACATAAACTCTTTTTCTCTTTCT |
| AACTTATCATGTTCATGTCTAAAACGTATACATGCTCACATC |
| ATTGTTCGTTTCAGCTGACTTACTTATGTAAGAGAGCTATCT |
| AGTTAACAACTCTTGTAACTTTTTATTTGCTAGTCAGAACAT |
| GGATTGGTGCAAGCATGGGAATTTGCCAACACTCTACCAAA |
| TCGATTGGAGTTTGGACTTAGTTTCACCAGAAGCCATACCCG |
| GACACTTACTGGGACTGTCAACAAAGCCGCATTGTGATGT |
| ACTTGGATGTTTCACGTGCCTGAGGTGTGAGTTACTTGGAAG |
| GGAAGCGGTTTATTTAATTGTTTTCCTAAGTAGATTTTGCTTA |
| CAAGCTTTTACTTTTCACTTGGAAGGGTTTTCTTGTTTTAAGC |
| TTTTCGAATTAGAGTTTCGGTTGCATTAAGAGTAGTCGTATT |
| AGTCTTTTTTACCTAAGACTCTTTTTTGTAATTTTCAGACTAT |
| GCAATTCAAGTTTTGAGTGTTTTCTTGCTTGTGTGATTGTGAG |
| TTGGTGAATTCGTCTTTCATACATTTTGAGATTATCAGAAGC |
| TTTATGCTCCACCGGTAGTCTAGTACCTTTTCTGTTACTGTAC |
| GTGCAGGGAAGTAATCTGGTACCTTCTATATATATGGAAAA |
| ACATACATTATACATTACGCAAAATTCTTACAGGTTAGTTAC |
| TTCCTGGAACTTCATTTACACTTGGTTTTTTTTGTTCCATTCC |
| CTCGGAAGACTATTCCCTCTGAGAAATATGTAATGAATTTCT |
| GTATTCAGCTGCATTTACAATGAAGTTTAAGCAGACACTCTC |
| TTTATATAGTGCCTCTTTCTGGAGCACCGTAGAGCTGTCTGT |
| GGTTGATCACCATATGCTGCCGAGAGATTCAGCAATCGCGT |
| GTTTGATCAGGTAAAAGTTTTTATGTCAATGTGTTTTTTTTT |
| CCGTTTGATCAATTTATGTCTGTATTCAGATTCTTATCTTCTT |
| ACAGTAGCATAACACATTGTTTCTTTCATTTATGTAAACTGT |

TABLE 2-continued

Sequence information

```
TTCAAGATTACAGAGATGTATGCTTCAGTCGACATTGATGAT
AACTTAAGATGGCATTCCTACAACAGTTGCAGGCGCATTCTA
ACTCCGGCAATTCTAGTTAGGCAAGAGGAGCATTGCCAATA
CCTGCCACCTCTGGGATTTACTATACCAGGGTTGAAGTTTAT
GGAAGACACCAGCTATGCACAAGCCTTCAAGGGGTCATCCT
ACATAACAAGTTGAACCAACCAATTGCTTGTTGGTTCAGTGG
TAATTGGAGCTGAATTCGGTAGGGATGGCCCGTGTTCGATCC
CCACAACAACAATTGGGAGGGGACTGGAACCTATCCACACA
GAACTCGCCCTGAATCCGGATTAGCCCTAAGGGTGAACGGG
GTGCTAACACCAAAAAAAAACATAACAAGTTGAATCAAAC
ATACTTTGTTTGAATTGAAGATTTAGTGATTTCATTTGATCG
ATTGAGATGTCTTATTATAAGCGTATATGCTCTTGGATTTGG
CCACTTAGGTGTTGTTTGACAATTGGTCATTAACTCGCTTTTA
TATTTTCGTTTCTCTTAGGAAAGGTGATCCTGAGAATTTATA
TTGAAACACTTTTTTTATCTCTCACTAGCTTTAAAAAAGTGTT
CTGTGTTACCTGCAATTCAACTTGATTATTTTTCACATAGTTT
TACCTGAAAAAGTGTTATCTGAAAATCAACTGACATAAATTT
TTGTTTGGATCAAATTAAGGATACTAGATAAATCGGAAAAA
ATAATCAACCAATTAAGTACTTCATAATTAAATATGAAGTAT
ATTATTATCTTATGCTTGTG
```

Although the present invention and its advantages have been described in detail, it should be understood that various changes, substitutions and alterations can be made herein without departing from the spirit and scope of the invention as defined in the appended claims.

The present invention will be further illustrated in the following Examples which are given for illustration purposes only and are not intended to limit the invention in any way.

EXAMPLES

Example 1: Testing for Resistance to *Peronospora farinosa* f. Sp. *Spinaciae* in Spinach Plants The resistance to downy mildew infection was assayed as described by Irish et al. (2008; Phytopathol. 98:894-900), using a differential set. Spinach plants of the invention were sown along with spinach plants from different other genotypes (see Table 3) in trays containing Scotts Redi-Earth medium and fertilized twice a week after seedling emergence with Osmocote Peter's (13-13-13) fertilizer (Scotts). Plants were inoculated with a sporangial suspension (2.5× $10^5$/ml) of a pathogenic race of *Peronospora farinosa* f. sp. *spinaciae* at the first true leaf stage. In this manner, 4 officially recognized pathogenic race were tested.

The inoculated plants were placed in a dew chamber at 18° C. with 100% relative humidity for a 24 h period, and then moved to a growth chamber at 18° C. with a 12 h photoperiod for 6 days. After 6 days, the plants were returned to the dew chamber for 24 h to induce sporulation, and they were scored for disease reaction.

Plants for this specific test were scored as resistant, intermediately resistant, or susceptible based on symptoms of chlorosis and signs of pathogen sporulation on the cotyledons and true leaves, as described by Irish et al. (2007; Plant Dis. 91:1392-1396). Plants exhibiting no evidence of chlorosis and sporulation were in this specific test considered as resistant. Resistant plants were re-inoculated to assess whether plants initially scored as resistant had escaped infection, or whether they were truly resistant. Plants that showed only symptoms of chlorosis, or sporulation occurring only on the tips of the cotyledons were scored as intermediately resistant. Plants showing more than these symptoms of downy mildew infection were scored as being susceptible.

Table 1 shows the resistance of a plant carrying the alpha-WOLF 24 allele to each one of these pathogenic races. Table 3 shows the differential set of spinach downy mildew races and the resistance of various spinach varieties (hybrids) to each one of these pathogenic races. A susceptible reaction is scored as "+" (indicating a successful infection by the fungus, with sporulation occurring on the entire cotyledon), and resistance is depicted as "−" (absence of sporulation on the cotyledons). A weak resistance response is indicated as "(−)", which in practice means a slightly reduced level of infection (with only symptoms of chlorosis, or sporulation only occurring on the tips of the cotyledons in the differential seedling test).

TABLE 3

| Races/plants | Viroflay | Resistoflay | Califlay | Clermont | Campania | Boeing | Lion | Lazio | Whale | Polka | Pigeon | Meerkat |
|---|---|---|---|---|---|---|---|---|---|---|---|---|
| Pfs: 1 | + | − | − | − | − | − | − | − | − | − | − | − |
| Pfs: 2 | + | − | + | − | − | − | − | − | − | − | − | − |
| Pfs: 3 | + | + | − | − | − | − | − | − | − | − | − | − |
| Pfs: 4 | + | + | + | − | − | − | − | − | (−) | + | − | − |
| Pfs: 5 | + | + | − | + | − | − | − | − | − | − | − | − |
| Pfs: 6 | + | + | + | + | + | − | − | − | (−) | + | − | − |
| Pfs: 7 | + | + | + | + | − | − | − | − | (−) | + | − | − |
| Pfs: 8 | + | + | − | + | + | + | − | − | − | − | − | − |
| Pfs: 9 | + | + | − | + | + | − | − | − | − | − | − | − |
| Pfs: 10 | + | + | + | + | + | + | + | − | + | + | − | − |
| Pfs: 11 | + | + | − | + | − | − | + | − | − | − | − | − |
| Pfs: 12 | + | + | − | + | + | + | − | + | − | − | − | − |

TABLE 3-continued

| Races/plants | Viroflay | Resistoflay | Califlay | Clermont | Campania | Boeing | Lion | Lazio | Whale | Polka | Pigeon | Meerkat |
|---|---|---|---|---|---|---|---|---|---|---|---|---|
| Pfs: 13 | + | + | + | + | (-) | - | - | + | + | (-) | - | - |
| Pfs: 14 | + | + | - | + | + | + | - | + | (-) | - | + | - |
| Pfs: 15 | + | + | + | - | - | - | - | - | + | + | - | - |
| Pfs: 16 | + | + | - | + | - | - | - | + | - | - | + | + |

Example 2: Amplification of the LRR Domain-Encoding Region

The isolated genomic DNA of a spinach plant comprising the alpha-WOLF 24 allele, of which a representative sample of seed was deposited with the NCIMB under accession number NCIMB 43554 was used in polymerase chain reactions (PCR), using forward primer ACAAGTGGATGTGTCTTAGG (SEQ ID NO: 4) and reverse primer TTCGCCCTCATCTTCCTGG (SEQ ID NO: 5). The primer pair amplifies the LRR domain-encoding region of an alpha-WOLF gene, and has been designed for selectively amplifying part of a WOLF gene, and not of other CC-NBS-LRR protein-encoding genes.

PCR conditions for amplifying the LRR domain-encoding region of an alpha-WOLF gene using primers having SEQ ID NO: 4 and SEQ ID NO: 5 were as follows, using Platinum Taq enzyme (Thermo Fisher Scientific):
- 3 minutes at 95° C. (initial denaturing step)
- 40 amplification cycles, each cycle consisting of: 30 seconds denaturation at 95° C., 30 seconds annealing at 60° C., and 30 seconds extension at 72° C.
- 2 minutes at 72° C. (final extension step)

The isolated genomic DNA of a spinach plant of variety Viroflay comprising the beta-WOLF 0 allele was used in polymerase chain reactions (PCR), using forward primer TCACGTGGGTTGTGTTGT (SEQ ID NO: 6) and reverse primer TTCGCCCTCATCTTCCTGG (SEQ ID NO: 5). The primer pair amplifies the LRR domain-encoding region of a beta-WOLF gene, and has been designed for selectively amplifying part of a WOLF gene, and not of other CC-NBS-LRR protein-encoding genes.

PCR conditions for amplifying the LRR domain-encoding region of a beta-WOLF gene using primers having SEQ ID NO: 5 and SEQ ID NO: 6 were as follows, using Platinum Taq enzyme (Thermo Fisher Scientific):
- 3 minutes at 95° C. (initial denaturing step)
- 40 amplification cycles, each cycle consisting of: 30 seconds denaturation at 95° C., 50 seconds annealing at 58° C. and 50 seconds extension at 72° C.
- 2 minutes at 72° C. (final extension step)

The PCR products were visualized on agarose gel (not shown), and DNA was purified from the PCR reaction. Subsequently the sequence of the PCR products was determined using methods well known in the art.

The DNA sequence of the LRR domain of the alpha-WOLF 24 allele amplified by primers having SEQ ID NO: 4 and SEQ ID NO: 5 is provided in Table 2 under SEQ ID NO: 9.

The DNA sequence of the LRR domain of the beta-WOLF 0 allele amplified by primers having SEQ ID NO: 5 and SEQ ID NO: 6 is provided in Table 2 under SEQ ID NO: 7.

Finally, the obtained sequences were translated into the corresponding amino acid sequence of the LRR domain having SEQ ID NO: 10 and SEQ ID NO: 8 for the alpha-WOLF 24 allele and the beta-WOLF 0, respectively (See also Table 2).

If PCR products were to be sequenced using SMRT sequencing (Pacific Biosciences), PCR primers and PCR conditions were different.

To the above-mentioned forward primers the following standard amplification sequence was added: GCAGTCGAACATGTAGCTGACTCAGGTCAC (SEQ ID NO: 14).

To the reverse primer, the following standard amplification sequence was added: TGGATCACTTGTGCAAGCATCACATCGTAG (SEQ ID NO: 15).

Example 3: Introducing an Alpha-WOLF 24 Allele in a Plant not Carrying the Allele A spinach plant comprising the alpha-WOLF 24 allele, of which a representative sample of seed was deposited with the NCIMB under accession number NCIMB 43554 was crossed with a plant of variety Viroflay carrying the beta-WOLF 0 allele to obtain a F1 generation. Subsequently, a F1 plant was selfed to obtain a F2 population.

Plants of the F2 population were assayed as described in Example 1 for resistance to *Peronospora farinosa* f. sp. *spinaciae* Pfs: 7. Approximately 75% of the plants scored completely resistant in the assay. This segregation pattern is consistent with that of a dominant inheritance.

Genomic DNA of each plant of the same F2 population was isolated and used in two different polymerase chain reactions (PCR). The first PCR reaction was done using primers for amplifying the LRR domain of an alpha-WOLF allele and the second PCR reaction was done using primers for amplifying the LRR domain of a beta-WOLF allele, both as described in Example 2.

The PCR products were visualized on agarose gel (not shown), this demonstrated that approximately 75% of the plants contained an alpha-WOLF fragment, and that the remaining approximately 25% of the plants only contained a beta-WOLF fragment. The plants containing the alpha-WOLF fragment completely correlated with the plants that scored resistant for Pfs: 7. The plants only comprising the beta-WOLF fragment completely correlated with the plants that scored susceptible for Pfs: 7.

DNA from the PCR reaction was purified, and subsequently the sequence of the PCR products was determined. The alpha-WOLF PCR products gave a sequence that corresponded to the sequence of SEQ ID NO: 9, the genomic sequence of the LRR domain of the alpha-WOLF 24 allele. The beta-WOLF PCR products gave a sequence that corresponded to the sequence of SEQ ID NO: 7 the genomic sequence of the LRR domain of the beta-WOLF 0 allele.

The invention is further described by the following numbered paragraphs:

1. An agronomically elite spinach plant comprising an allele which confers resistance to at least one *Peronospora farinosa* f. sp. *spinaciae* race when present in a spinach plant and encodes a protein that in order of increased preference has at least 92%, 93%, 94%, 95%, 96%, 97%, 98%, 99%, 99.1%, 99.2%, 99.3%, 99.4%, 99.5%, 99.6%, 99.7%, 99.8%, 99.9%, 100% sequence identity to a protein comprising an amino acid sequence SEQ ID NO: 12; wherein said protein comprises in its amino acid sequence: a) SEQ ID NO: 1, b) SEQ ID NO: 2, and wherein the LRR domain of the protein has in order of increased preference at least 92%, 93%, 94%, 95%, 96%, 97%, 98%, 98.2%, 98.5%, 98.8%, 99%, 99.2%, 99.5%, 99.8%, 100% sequence identity to SEQ ID NO: 10.

2. The agronomically elite spinach plant of paragraph 1, wherein the allele when heterozygously or homozygously present in a spinach plant encodes a protein that confers complete resistance to at least *Peronospora farinosa* f. sp. *spinaciae* races Pfs: 1, Pfs: 2, Pfs: 5, Pfs: 6, Pfs: 7, Pfs: 9, Pfs: 11, Pfs: 13, Pfs: 15 and Pfs: 17, and does not confer resistance to downy mildew race Pfs: 16.

3. An agronomically elite spinach plant comprising an allele which when heterozygously or homozygously present in a spinach plant encodes a protein that confers complete resistance to at least *Peronospora farinosa* f. sp. *spinaciae* races Pfs: 1, Pfs: 2, Pfs: 5, Pfs: 6, Pfs: 7, Pfs: 9, Pfs: 11, Pfs: 13, Pfs: 15 and Pfs: 17, and does not confer resistance to downy mildew race Pfs: 16, wherein the allele has a nucleotide sequence which has in order of increased preference has at least 92%, 93%, 94%, 95%, 96%, 97%, 98%, 98.2%, 98.5%, 98.8%, 99%, 99.2%, 99.5%, 99.8%, 100% sequence identity to SEQ ID NO: 11.

4. The agronomically elite spinach plant of any one of paragraphs 1 to 3, of which a representative sample of seed capable of growing into a plant comprising said allele was deposited with the NCIMB under accession number NCIMB 43554.

5. The agronomically elite spinach plant of any one of paragraphs 1 to 4, wherein the agronomically elite spinach is a plant of a hybrid variety or a plant of an inbred line.

6. A propagation material capable of developing into the agronomically elite spinach plant of any one of paragraphs 1 to 5 and wherein the propagation material comprises a microspore, a pollen, an ovary, an ovule, an embryo, an embryo sac, an egg cell, a cutting, a root tip, a hypocotyl, a cotyledon, a stem, a leaf, a flower, an anther, a seed, a meristematic cell, a protoplast, a cell, or a tissue culture thereof.

7. A cell of the agronomically elite spinach plant of any one of paragraphs 1 to 5.

8. A method of producing an F1 hybrid spinach seed comprising crossing a first parent spinach plant with a second parent spinach plant and harvesting the resultant hybrid spinach seed, wherein said first parent spinach plant and/or said second parent spinach plant is the agronomically elite spinach plant of any one of paragraphs 1 to 5.

9. The method of paragraph 8, wherein the first and/or second parent is a plant of an inbred line.

10. An F1 hybrid spinach plant grown from the seed produced by the method of paragraph 8 or 9, wherein the F1 hybrid plant carries the allele which confers resistance to at least one *Peronospora farinosa* f. sp. *spinaciae* race when present in a spinach plant and encoding a CC-NBS-LRR protein that in order of increased preference has at least 92%, 93%, 94%, 95%, 96%, 97%, 98%, 99%, 99.1%, 99.2%, 99.3%, 99.4%, 99.5%, 99.6%, 99.7%, 99.8%, 99.9%, 100% sequence identity to a protein comprising an amino acid sequence SEQ ID NO: 12; wherein said protein comprises in its amino acid sequence: (a) SEQ ID NO: 1, (b) SEQ ID NO: 2, and wherein the LRR domain of the protein has in order of increased preference at least 92%, 93%, 94%, 95%, 96%, 97%, 98%, 98.2%, 98.5%, 98.8%, 99%, 99.2%, 99.5%, 99.8%, 100% sequence identity to SEQ ID NO: 10.

11. A method for producing a spinach plant showing resistance to *Peronospora farinosa* f. sp. *spinaciae* comprising: (a) crossing the agronomically elite spinach plant of any one of paragraphs 1 to 5 with another spinach plant; (b) optionally performing one or more rounds of selfing and/or crossing; (c) optionally selecting after the crossing or the one or more rounds of selfing and/or crossing for a plant that comprises said allele.

12. The method of paragraph 11, wherein the method includes performing the optional selection, and the selection of the plant comprising the allele expressing the protein comprises determining the presence of the allele according to a method comprising any one or more of: determining the presence of a nucleotide sequence in a plant, wherein said sequence has in order of increased preference at least 92%, 93%, 94%, 95%, 96%, 97%, 98%, 98.2%, 98.5%, 98.8%, 99%, 99.2%, 99.5%, 99.8%, 100% sequence identity to SEQ ID NO: 11, or determining the presence of a LRR domain as having in order of increased preference at least 92%, 93%, 94%, 95%, 96%, 97%, 98%, 99%, 99.1%, 99.2%, 99.3%, 99.4%, 99.5%, 99.6%, 99.7%, 99.8%, 99.9%, 100% sequence identity to SEQ ID NO: 9.

13. The method of paragraph 11 or 12, wherein the method includes performing the optional one or more rounds of selfing and/or crossing and the optional selection, and the selection of the plant comprising the allele expressing the protein comprises determining the presence of the allele according to a method comprising any one or more of: determining the presence of a nucleotide sequence in a plant, wherein said sequence has in order of increased preference at least 92%, 93%, 94%, 95%, 96%, 97%, 98%, 98.2%, 98.5%, 98.8%, 99%, 99.2%, 99.5%, 99.8%, 100% sequence identity to SEQ ID NO: 11, or determining the presence of a LRR domain as having in order of increased preference at least 92%, 93%, 94%, 95%, 96%, 97%, 98%, 99%, 99.1%, 99.2%, 99.3%, 99.4%, 99.5%, 99.6%, 99.7%, 99.8%, 99.9%, 100% sequence identity to SEQ ID NO: 9.

14. A method of producing an F1 hybrid spinach seed comprising crossing a first parent spinach plant with a second parent spinach plant and harvesting the resultant hybrid spinach seed, wherein said first parent spinach plant and/or said second parent spinach plant is the agronomically elite spinach plant of any one of paragraphs 1 to 5.

21. An allele designated alpha-WOLF 24 which confers resistance to at least one *Peronospora farinosa* f. sp. *spinacea* race, wherein the protein encoded by said allele is a CC-NBS-LRR protein that comprises in its amino acid sequence: a) the motif "MAEIGYSVC" (SEQ ID NO: 1) at its N-terminus; and b) the motif "KWMCLR" (SEQ ID NO: 2); and wherein the LRR domain of the protein has in order of increased preference at least 95%, 96%, 97%, 98%, 98.2%, 98.5%, 98.8%, 99%, 99.2%, 99.5%, 99.8%, 100% sequence identity to SEQ ID NO: 10.

22. The allele of paragraph 21 wherein the genomic DNA sequence of the LRR domain in order of increased preference has at least 95%, 96%, 97%, 98%, 99%, 99.1%, 99.2%, 99.3%, 99.4%, 99.5%, 99.6%, 99.7%, 99.8%, 99.9%, 100% sequence identity to SEQ ID NO: 9.

23. The allele of paragraph 21, wherein the allele when present in a spinach plant confers complete resistance to at least *Peronospora farinosa* f. sp. *spinacea* race Pfs: 1, Pfs: 2, Pfs: 5, Pfs: 6, Pfs: 7, Pfs: 9, Pfs: 11, Pfs: 13, Pfs: 15 and Pfs: 17, and does not confer resistance to downy mildew race Pfs: 16.

24. A spinach plant comprising the allele of any of the paragraphs 21 to 23, of which a representative sample of seed capable of growing into a plant comprising said allele was deposited with the NCIMB under accession number NCIMB 43554.

25. The spinach plant of paragraph 24, wherein the plant is an agronomically elite plant.

26. The spinach plant of paragraph 25, wherein the agronomically elite plant is a hybrid variety or an inbred line.

27. The spinach plant of paragraph 26, further comprising a genetic determinant resulting in resistance against *Peronospora farinosa* f. sp. *spinacea* races Pfs: 1 to Pfs: 17.

28. Propagation material capable of developing into and/or being derived from a spinach plant as defined in any one of paragraphs 24 to 27, wherein the propagation material comprises the allele of any one of paragraphs 21 to 23 and wherein the propagation material is selected from a group consisting of a microspore, a pollen, an ovary, an ovule, an embryo, an embryo sac, an egg cell, a cutting, a root, a root tip, a hypocotyl, a cotyledon, a stem, a leaf, a flower, an anther, a seed, a meristematic cell, a protoplast, a cell, or a tissue culture thereof.

29. Cell of a spinach plant, which cell comprises the allele of any one of paragraphs 21 to 23.

30. A method of producing a hybrid spinach seed comprising crossing a first parent spinach plant with a second parent spinach plant and harvesting the resultant hybrid spinach seed, wherein said first parent spinach plant comprises the allele of any one of paragraphs 21 to 23.

31. The method of paragraph 30, wherein the first and/or second parent is a plant of an inbred line.

32. A hybrid spinach plant grown from the seed produced by the method of paragraph 30 or paragraph 31.

33. Method for identifying a spinach plant carrying the allele of any one of paragraphs 21 to 23, comprising determining the presence of the LRR domain as defined in paragraph 21 by determining its genomic nucleotide sequence or a part thereof in the genome of a plant, wherein said sequence has in order of increased preference 95%, 96%, 97%, 98%, 99%, 99.1%, 99.2%, 99.3%, 99.4%, 99.5%, 99.6%, 99.7%, 99.8%, 99.9%, 100% sequence identity to SEQ ID NO: 9.

34. The method of paragraph 33, wherein the LRR domain is determined by using a primer pair to amplify the LRR domain, wherein the forward primer is a nucleic acid molecule having the sequence of SEQ ID NO: 4.

35. The method of paragraph 33, wherein the LRR domain is determined by using a primer pair to amplify the LRR domain, wherein the reverse primer is a nucleic acid molecule having the sequence of SEQ ID NO: 5.

36. Primer pair comprising a forward primer which is a nucleic acid molecule having the sequence of SEQ ID NO: 4 and a reverse primer which is a nucleic acid molecule having the sequence of SEQ ID NO: 5.

37. A method for producing a spinach plant showing resistance to *Peronospora farinosa* f. sp. *spinaciae* comprising:
(a) crossing a plant comprising the allele of paragraph 21 or 22, with another plant;
(b) optionally performing one or more rounds of selfing and/or crossing;
(c) selecting after one or more rounds of selfing and/or crossing for a plant that comprises said allele of any one of paragraphs 21 to 23.

38. The method of paragraph 37, wherein the selection of a plant comprising the allele comprises determining the presence of the allele according the method of any one of paragraphs 33 to 35.

Having thus described in detail preferred embodiments of the present invention, it is to be understood that the invention defined by the above paragraphs is not to be limited to particular details set forth in the above description as many apparent variations thereof are possible without departing from the spirit or scope of the present invention.

---

What is claimed is:

1. A method for identifying a spinach plant carrying an allele designated alpha-WOLF 24;
    wherein the allele confers resistance to at least one *Peronospora farinosa* f. sp. *spinaciae* race;
    wherein the protein encoded by said allele is a CC-NBS-LRR protein that comprises in its amino acid sequence a) the motif "MAEIGYSVC" (SEQ ID NO: 1) at its N-terminus; and b) the motif "KWMCLR" (SEQ ID NO: 2); and
    wherein the method comprises determining the presence of the LRR domain by determining its genomic nucleotide sequence or a part thereof in the genome of a plant, wherein said genomic nucleotide sequence has the sequence of SEQ ID NO: 9, and selecting the plant comprising the LRR domain, thereby identifying the spinach plant carrying the allele designated alpha-WOLF 24.

2. The method of claim 1, wherein the LRR domain is determined with a primer pair to amplify the LRR domain, wherein the forward primer is a nucleic acid molecule having the sequence of SEQ ID NO: 4.

3. The method of claim 1, wherein the LRR domain is determined with a primer pair to amplify the LRR domain, wherein the reverse primer is a nucleic acid molecule having the sequence of SEQ ID NO: 5.

4. A method for producing a spinach plant showing resistance to *Peronospora farinosa* f. sp. *spinaciae* comprising:
    (a) crossing the spinach plant identified to carry the allele designated alpha-WOLF 24 by the method of claim 1, with another plant;
    (b) optionally performing one or more rounds of selfing and/or crossing;
    (c) selecting after one or more rounds of selfing and/or crossing for a spinach plant comprising the allele designated alpha-WOLF 24;
    wherein the selection of the spinach plant comprising the allele designated alpha-WOLF 24 comprises determining the presence of the allele comprising determining the presence of the LRR domain by determining its genomic nucleotide sequence or a part thereof in the genome of a plant, wherein said genomic sequence has the sequence of SEQ ID NO: 9.

* * * * *